United States Patent [19]

Sawada

[11] Patent Number: 5,844,625
[45] Date of Patent: Dec. 1, 1998

[54] PICTURE PROCESSING APPARATUS FOR HANDLING COMMAND DATA AND PICTURE DATA

[75] Inventor: Koichi Sawada, Kanagawa, Japan

[73] Assignee: Sony Corporation, Tokyo, Japan

[21] Appl. No.: 519,501

[22] Filed: Aug. 25, 1995

[30] Foreign Application Priority Data

Aug. 26, 1994 [JP] Japan .................................. 6-200879

[51] Int. Cl.$^6$ .................................................. H04N 5/14
[52] U.S. Cl. ........................ 348/571; 348/718; 348/719; 345/511; 345/522
[58] Field of Search .................................. 348/714, 718, 348/719, 523, 571, 589; 360/35.1; 345/192, 193, 200, 201, 508, 511, 522, 526; 364/242.3, 242.31; 395/166; G06F 13/28; H04N 5/14

[56] References Cited

U.S. PATENT DOCUMENTS

| 4,833,625 | 5/1989 | Fisher et al. ............................. 345/201 |
| 4,837,487 | 6/1989 | Karakake et al. ....................... 364/513 |
| 4,996,598 | 2/1991 | Hara ........................................ 348/589 |
| 5,218,455 | 6/1993 | Kristy ...................................... 358/403 |
| 5,406,311 | 4/1995 | Michelson ............................... 348/715 |
| 5,440,401 | 8/1995 | Parulski et al. . |
| 5,546,137 | 8/1996 | Takeuchi ................................. 348/719 |
| 5,633,726 | 5/1997 | Timmerans . |
| 5,664,163 | 9/1997 | Yutaka et al. ........................... 345/522 |

FOREIGN PATENT DOCUMENTS

| 3-290871 | 12/1991 | Japan ............................. G11B 20/12 |
| 4-182981 | 6/1992 | Japan ............................. G11B 27/00 |
| 4-273786 | 9/1992 | Japan ............................... H04N 5/91 |
| 5-191761 | 7/1993 | Japan ............................... H04N 5/76 |
| 5-219387 | 8/1993 | Japan ............................. H04N 1/411 |
| 5-234260 | 9/1993 | Japan ............................. G11B 20/12 |
| 5-325500 | 12/1993 | Japan ............................. G11B 27/00 |
| 6-105273 | 4/1994 | Japan ............................ H04N 5/907 |

Primary Examiner—Sherrie Hsia
Attorney, Agent, or Firm—Limbach & Limbach LLP

[57] ABSTRACT

When a storage unit 18 records the title of a picture or the like with the ASCII codes along with the picture data and reads out the data for transfer. A DMAC controller 2a transfers the ASCII codes along with the picture data stored in a buffer circuit 22 in a lump to a frame memory 1 at a high transfer speed without interposition of a CPU 8. The memory controller 2 interprets the ASCII codes stored in the frame memory 1 to form picture data of letters or characters associated with the ASCII codes and writes the data in the frame memory 1. The picture data stored in the frame memory 1 is read out and routed to a monitoring device 15 so that the letters or characters associated with the ASCII codes are displayed along with a picture corresponding to the picture data.

13 Claims, 17 Drawing Sheets

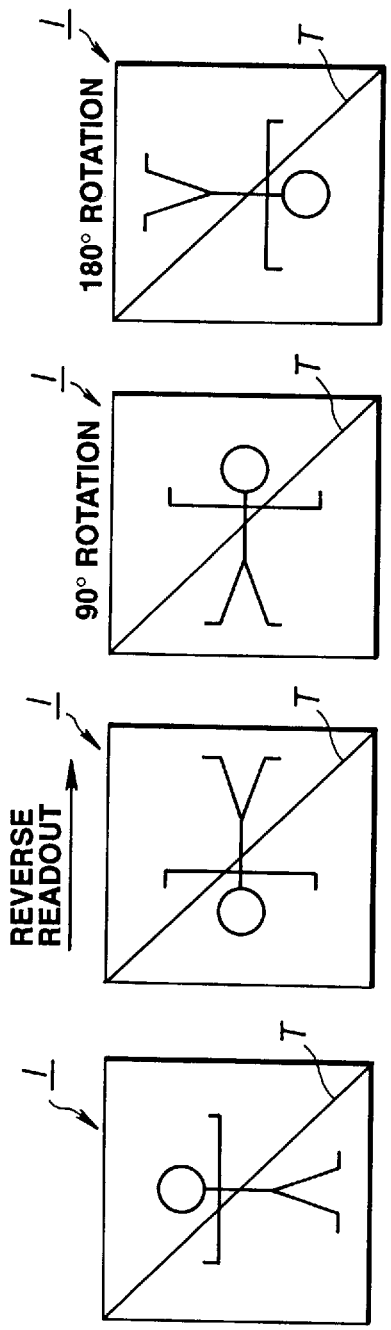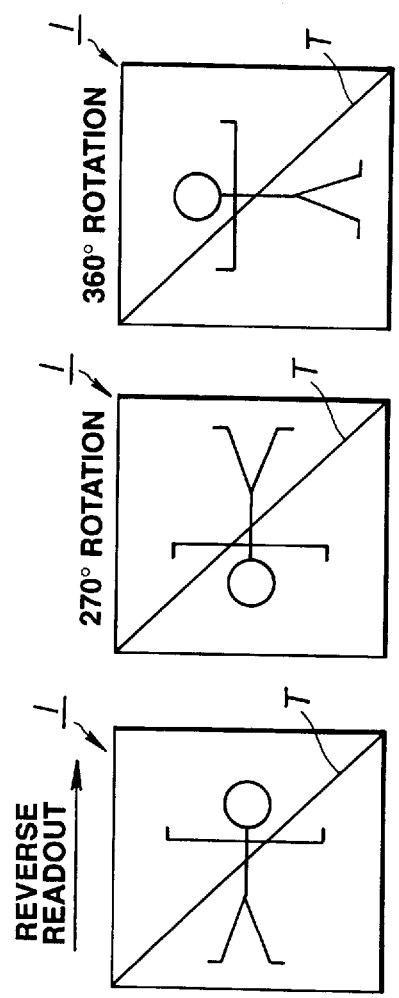

PICTURE PROCESSING APPARATUS FOR HANDLING COMMAND DATA AND PICTURE DATA

BACKGROUND OF THE INVENTION

1. Field of the Invention

This invention relates to a picture processing device conveniently provided in equipment for handling picture data. More particularly, it relates to a picture processing device in which command data for designating desired data processing is transferred at a high speed in a lumped manner with picture data without the interposition of the main control means. This enables a large quantity of command data to be transferred at a high speed without affecting data processing of the main control means.

2. Description of the Related Art

Heretofore, two separate pieces of equipment for handling picture data, such as a picture recording/reproducing apparatus for recording/reproducing picture data and a picture processing apparatus for enlarging or contracting the picture size, are interconnected via a bus line and a serial interface. The bus line is for picture data transmission, that is, for transmitting and receiving the picture data. The serial interface is for transmitting and receiving the command data for designating data processing of picture data.

When transferring the picture data from the picture recording/reproducing apparatus and command data for designating the data processing of the picture data under such an interconnection scheme, a micro-computer within the picture recording/reproducing apparatus (first microcomputer) transfers the picture data over the bus line to the picture processing apparatus, while serially transferring the command data via the serial interface to the picture processing apparatus.

When supplied with the picture data, a micro-computer within the picture processing apparatus (second microcomputer) write-controls a frame memory for transiently storing the picture data therein. When supplied with the command data, the second microcomputer interprets data processing indicated by the command data and reads out pixel data stored in the frame memory. The second microcomputer also performs the data processing thus interpreted on the read-out picture data and transmits the processed picture data to, e.g., a monitoring device.

Thus a picture corresponding to the picture data from the picture recording/reproducing apparatus, processed in accordance with the above command data, may be displayed on the monitoring device.

When transferring the command data designating the data processing for picture data from the picture processing device, along with the picture data, the second microcomputer of the picture processing device transfers picture data over the bus line to the picture recording/reproducing apparatus, while serially transmitting the command data via the serial interface to the picture recording and/or reproducing apparatus.

When fed with the command data, the first microcomputer of the picture recording and/or reproducing apparatus interprets data processing indicated by the command data, effectuates the interpreted data processing on the picture data, and records the processed data on the recording medium.

Thus, the picture data processed in accordance with the command data may be recorded on the recording medium.

However, since the conventional practice has been to transmit the command data by serial transmission, a prolonged time is involved in transmitting a large quantity of the command data.

This inconvenience may be overcome by providing a parallel interface in each of the above devices. This, however, is not practical since the micro-computer needs to have a large number of ports and the number of interconnections between the respective devices is increased.

On the other hand, a large quantity of command data may be transmitted by directly connecting the data buses of the microcomputer to the bus line and transferring the command data along with the picture data. However, since the respective data needs to be directly transferred by the microcomputer, the microcomputer is occupied during transfer. In addition, the microcomputer itself needs to be of high performance in order to perform other data processing simultaneously. Such a high-performance micro-computer is costly and not particularly practical.

SUMMARY OF THE INVENTION

In view of the foregoing, it is an object of the present invention to provide a picture processing apparatus capable of transferring a large quantity of command data in a shorter time.

A picture processing apparatus according to the present invention has first control means for transferring command data designating pre-set data processing along with picture data. The apparatus further includes first storage means for transiently storing the picture data and the command data transferred from the first control means. The apparatus further includes high-speed transfer control means for reading out the picture data and the command data stored in the first storage means. The picture transfer apparatus also has second storage means for storing the picture data and the command data transferred at a high speed from the high-speed transfer control means, and second control means for performing data processing designated by the command data stored in the second storage means.

The second control means also write-controls the picture data and the command data in the second storage means, and the high-speed transfer means can also transfer the picture data and the command data written in the second storage means to the first storage means at a high speed. The first storage means also stores the picture data and the command data transferred at a high speed by the first transfer means transiently therein. The first storage means reads out the picture data and the command data stored in the first storage means and performs data processing as designated by the command data therein.

The second storage means has a picture storage area as an area for storage of the picture data therein and a command storage area as an area for storage of the command data therein. The high-speed transfer control means effects transfer control so that the picture data and the command data will be written in the picture storage area and the command storage area of the second storage means, respectively.

The command data can be in ASCII code for effecting a pre-set letter display. The second control means forms picture data for letters conforming to the ASCII code stored in the command storage area of the second storage means and causes the picture data to be written at pre-set locations in the picture storage area.

In accordance with the present invention, when transferring picture data and command data from the first control means to the second control means, the first storage means transfers command data designating pre-set data processing to the first storage means along with the picture data. Such command data may be so-called ASCII codes designating the processing contents for the picture data or displaying pre-set letters or characters. The first storage means transiently stores the picture data and the command data.

The picture data and the command data, stored in the first storage means, are read out by the high-speed transfer control means, and transferred at a high transfer speed to the second storage means without the interposition of the second control means.

The second storage means has a picture recording area for storing the picture data and a command storage area for storing the command data. The high-speed transfer control means transfer the data at a high speed so that the picture data and the command data will be stored in the respective storage areas.

When the data is stored in this manner in the second storage means, the second control means effectuates data processing designated by the command data stored in the storage means.

Specifically, if the command data is in ASCII code, the second control means form picture data or the letters or characters associated with the ASCII codes stored in the command storage areas of the second storage means and causes the picture data to be written in pre-set portions of the picture storage area.

Thus, when the picture data stored in the picture storage area is read out and supplied to, for example, the monitoring device, the title of the picture corresponding to the picture data, for example, may be displayed simultaneously with the picture.

Since the high-speed transfer control means in the picture processing device of the present invention effectuates high-speed transfer of command data along with picture data without the interposition of the second control means, a large quantity of command data can be transferred at a high speed in a shorter time without increasing the number of interconnections as in the case of parallel transfer.

In addition, since the high-speed transfer control means effectuates transfer of the respective data without the interposition of the second control means, it is not necessary for the second control means to be dedicated to the transfer of the respective data. Thus, an inexpensive second control means which is low in data processing speed may be employed, thus lowering the cost of the picture processing device.

It is also possible with the picture processing device of the present invention to transfer the picture data and the command data from the second control means to the first control means in the reverse order to the above-described transfer operation.

In this case, the second control means causes the picture data and the command data to be written in the respective storage areas of the second storage means. The high-speed transfer means transfers the picture data and the command data written in the second storage means to the first storage means. The first storage means transiently stores the picture data and the command data transferred at a high transfer speed by the high-speed transfer means. The first control means causes the picture data and the command data stored in the first storage means to perform data processing specified by the command data.

In this manner, a large quantity of command data may be transferred at a high transfer speed from the second control means to the first control means along with the picture data.

BRIEF DESCRIPTION OF THE DRAWINGS

FIG. 6A illustrates the addresses provided to the initialization selector 36 of FIG. 5; FIG. 6B illustrates the addresses provided to initialization selector 37 of FIG. 5; and FIG. 6C illustrates the memory select waveform provided at input terminal of FIG. 5 as a selection control data signal; FIG. 6D is the AR1 address output from flip-flop 39 of FIG. 5; and FIG. 6E is the AR2 address output from flip-flop 40 of FIG. 5.

FIG. 8A is a pixel representation of a picture as calculated by the arithmetic-logical circuit of FIG. 2; and FIG. 8B is a representation of four selected pixels.

FIGS. 11A–11G are diagrammatic view for illustrating the rewrite operation for the frame memory during rotation; specifically FIG. 11A shows picture data in its normal orientation; FIG. 11B shows the picture data rotated 270°; FIG. 11C shows the picture rotated 90° with respect to that in FIG. 11A; FIG. 11D shows the picture rotated 180° with respect to the original; FIG. 11E shows the picture rotated 90° as it is stored in the frame memory; FIG. 11F shows the original picture rotated by 270° with respect to the original as written in the frame memory; and FIG. 11G shows the picture restored to its normal position by a 360° rotation.

FIG. 17A illustrates the command area of the frame memory; FIG. 17B denotes an alphabetical letter stored in the command area; and FIG. 17C illustrates the small picture to which alphabetical data is attached.

DESCRIPTION OF THE PREFERRED EMBODIMENTS

Figure 1:
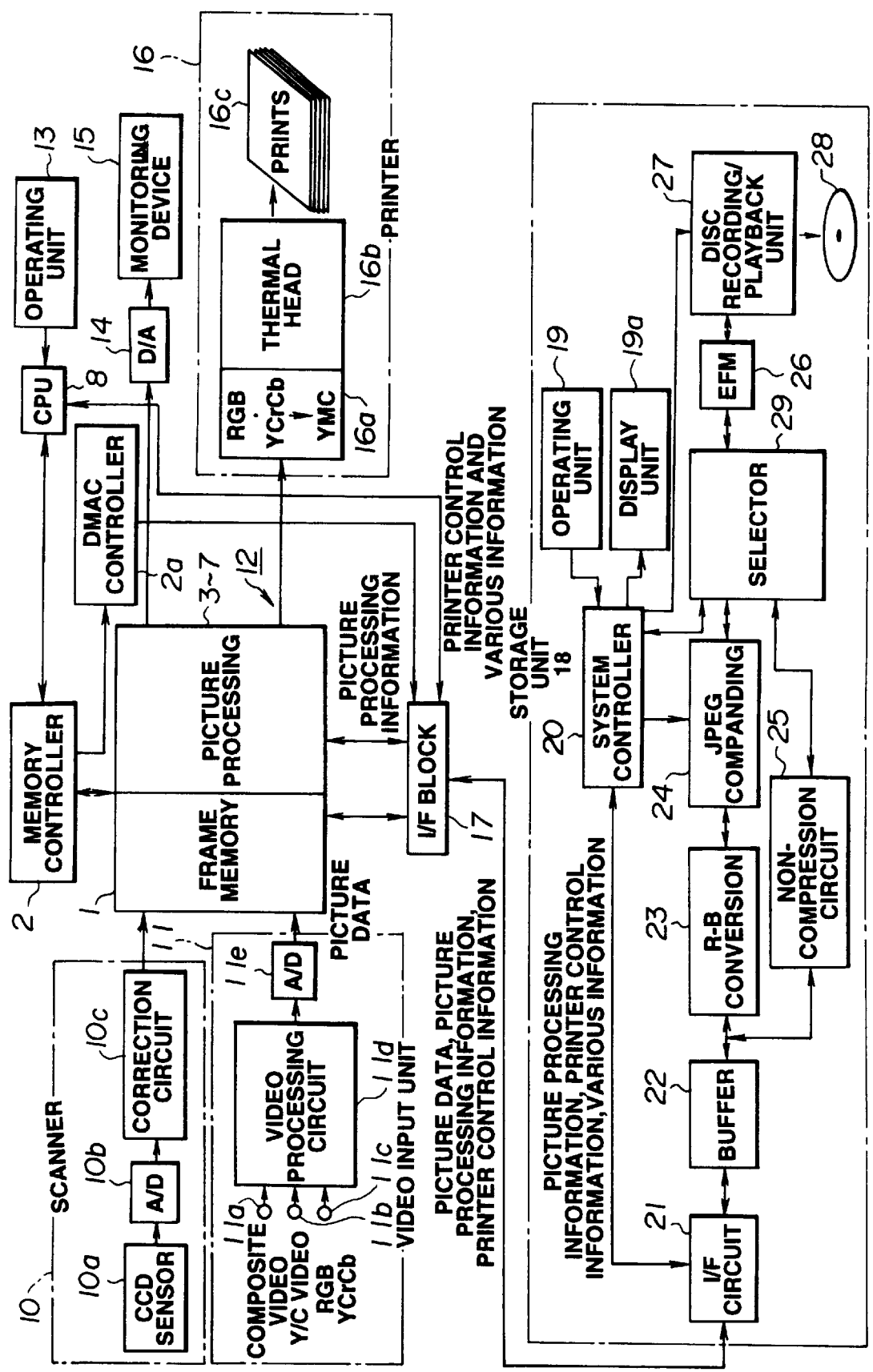
FIG. 1 is a block diagram of a picture processing device of the present invention when applied to a still picture recording/reproducing system.

Referring to the drawings, preferred embodiments of a picture processing device according to the present invention will be explained in detail.

The picture processing device embodying the present invention may be applied to a still picture recording/reproducing system shown in FIG. 1. In the recording/reproducing system of FIG. 1 picture data is supplied from, for example, a video tape recorder, or picture data is formed by reading a picture from a film or a photograph by a scanner. The picture data is recorded on an optical disc and reproduced on a monitoring device while being printed on a print or printing sheet.

Referring to FIG. 1, the still picture recording and/or reproducing system has a frame memory 1 having its recording area divided into plural storage areas in each of which picture data is to be stored. The system has a memory controller 2 for controlling writing and readout of the picture data on or from the frame memory 1. The system also has a central processing circuit (CPU) 8 for controlling the operation of the still picture recording and/or reproducing system in its entirety. The system also has a DMAC controller 2a for high-speed transfer of the command data for designating the processing of the picture data along with the picture data without the interposition of the CPU 8.

In addition, the still picture recording and/or reproducing system has a scanner 10 for reading out the picture from film or a photograph for forming picture data. A video input unit 11 is provided for forming picture data suited to the still picture recording and/or reproducing system based upon picture data supplied from external equipment such as a video tape recorder or a camera. A storage unit 18 is provided for recording the picture data supplied from the scanner 10 or the video input unit 11 on a recording medium and for reproducing the data therefrom.

The still picture recording and/or reproducing system has a picture processing block 12 for performing picture processing, such as enlargement, contraction and dissolution on the picture data supplied from the scanner 10, video input unit 11 or the storage unit 18 to the frame memory 1. The system also has an operating unit 13 having plural keys for designating, for example, recording/reproduction of the picture data or picture processing. The system also a monitoring device 15 for displaying a picture corresponding to the processed picture data. The system also has a printer 16 for printing the processed picture data.

Figure 2:
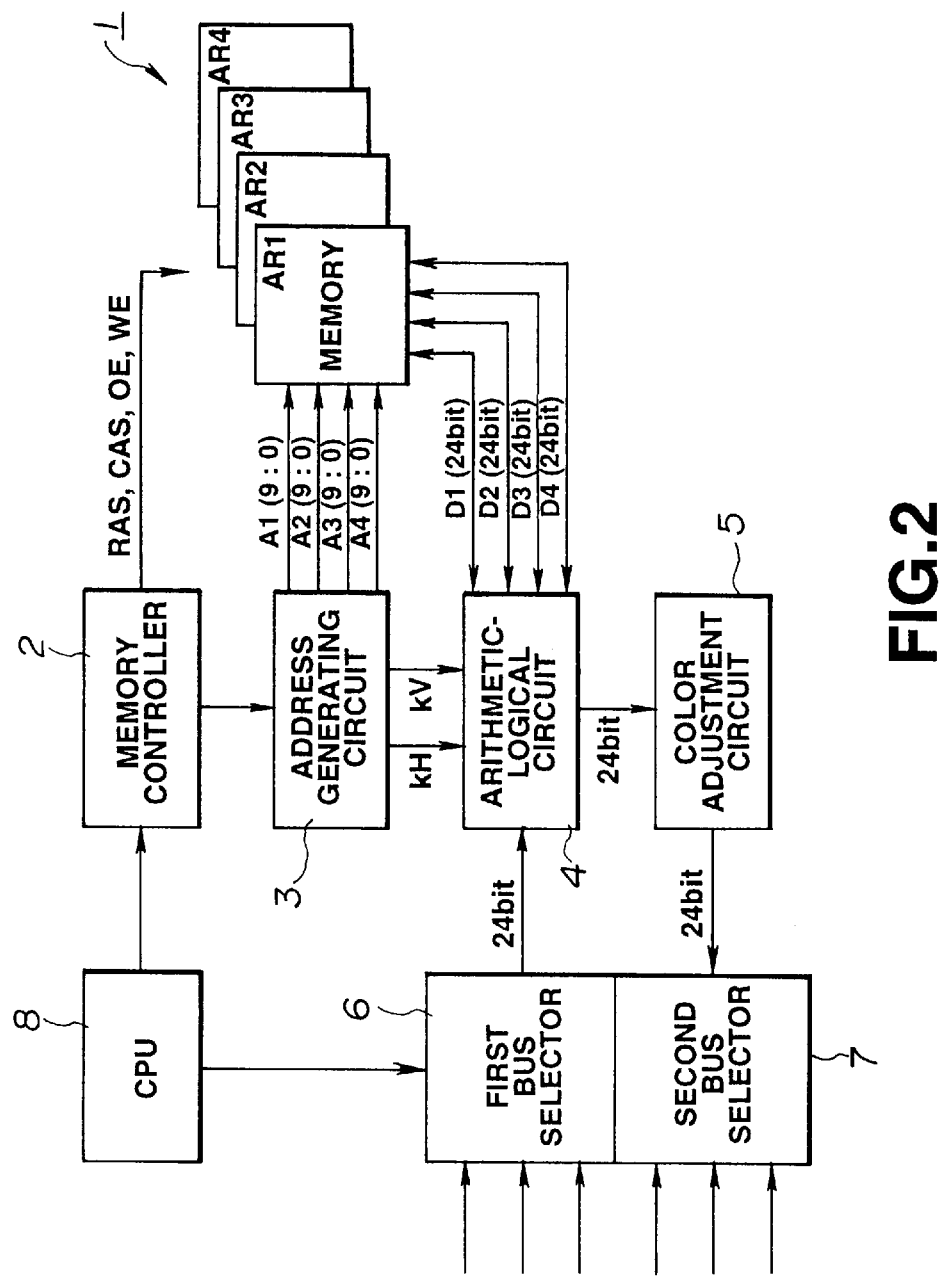
FIG. 2 is a block diagram of a picture processing block provided in the still picture recording/reproducing system.

The picture processing block 12 is constituted as shown in FIG. 2, and has an address generating circuit 3. The address generating circuit 3 forms write and readout addresses, each constituted by an integer part and a fractional part as later explained, for each recording area of the frame memory 1. The write and readout addresses are based upon the write control data and readout control data from the memory controller 2. The address generating circuit 3 also supplies the integer parts of the write address and the readout address to the frame memory 1. The picture processing block 12 also has an arithmetic-logical circuit 4 for performing arithmetic-logical operations for picture processing based upon the fractional parts of the write and readout addresses supplied from the address generating circuit 3 and the picture data read out from the frame memory 1.

The picture processing block 12 also has a color adjustment circuit 5 for performing color tone conversion on the picture data processed by the arithmetic-logical circuit 4. The picture processing block 12 also has a first bus selector 6 for selecting picture data supplied from plural external devices for supplying the selected picture data to the arithmetic-logical circuit 4. The picture processing block 12 also has a second bus selector 7 for selecting and outputting the external device supplying the picture data from the color adjustment circuit 5.

The frame memory 1 includes a frame memory for R for writing and reading red (R) picture data, a frame memory for G for writing and reading green (G) picture data and a frame memory for B for writing and reading blue (B) picture data.

Each color frame memory is made up of eight DRAMs and has a storage area for 2048×2048×8 bits. Specifically, each frame memory is formed by stacking two square arrays of DRAMs in two tiers, each square array of the DRAMs being made up of four DRAMs each of which comprises 1024×1024×4 bits or 4 Mbits of the storage area.

The frame memory 1 is formed by stacking the frame memories of the three colors, each having the storage capacity of 2048×2048×8 bits, in the order of R, G, and B. For example the frame memories may be stacked along the direction of depth, so that the frame memory 1 has the storage capacity of 2048×2048×24 bits.

The operation of the above-described still picture recording/reproducing system will now be explained, with additional reference to FIG. 1.

For storing the desired picture data on an optical disc 28 of the storage unit 18, the user acts on the operating unit 13. The user thereby designates the destination of the selected picture data, that is, the scanner 10 or the video input unit 11, and sets an output destination of the fetched data to the storage unit 18.

This causes the CPU 8 to set the scanner 10 or the video input unit 11 to an operating state. The CPU 8 controls the picture processing block 12 and an interfacing block 17 to output the picture data to the storage unit 18.

It is possible for the scanner 10 to read the picture of both the light-reflective original and a light-transmitting original. Specifically, an E-size, L-size or A6 size photograph, can be used as the light-reflective original. A 35 mm size or browny size negative film, can be used as the light-transmitting original. The original is read by the scanner 10. As the light-reflective original, an original printed from the 35 mm or browny size negative film, printed with the size remaining unchanged, may also be read.

When the film or the photograph is loaded on the original readout table, the scanner 10 reads the original by a CCD line sensor 10a. The CCD line sensor 10a forms still picture signals corresponding to the read-out picture and routes the signals to an A/D converter 10b. The A/D converter 10b digitizes still t-picture signals from the CCD line sensor 10a to form picture data which is routed to a correction circuit 10c. The correction circuit 10c, which has read the picture from, for example, the 35 mm film, corrects the picture data to picture data with a size of 1200 pixels by 1700 pixels, and outputs the corrected picture data. If the read-out original is a browny size film, an E-size photograph, an L-size photograph or an A-size photograph, the correction circuit corrects the originals to picture data made up of 1298×975 to 1875 pixels, 1050×1450 pixels, 1120×1575 pixels and 1325×1825 pixels, and outputs the corrected picture data.

The video input unit 11 can be fed with any of three different format video signals, that is: (1) composite video signals from, for example, a video tape recorder, (2) video signals of Y (luminance)/ C (chroma) separate formats and (3) video signals supplied by the RGB format. These video signals are supplied via input terminals 11a to 11c to a video processing system 11d.

The video processing system 11d converts the video signals of the respective formats into pixels in a square frame or lattice and sets the picture size to 480×640 pixels which are routed to an A/D converter 11e. The A/D converter 11e digitizes the video signals to form picture data corresponding to the video signals of the respective formats which are outputted.

The picture data formed by the scanner 10 or by the video input unit 11 is supplied to the picture processing unit 12. If picture processing such as enlargement, contraction, rotation or dissolution is designated, the picture processing block 12 performs such picture processing on the picture data and appends the picture processing information to the picture data. The resulting output information data is supplied to a D/A converter 14 and to an interfacing circuit 21 of the storage unit 18 via the interfacing block 17.

The D/A converter 14 converts the picture data into analog signals to form picture signals which are routed to the monitoring device 15. This causes a still picture corresponding to the picture data fetched from the film or the photograph to be displayed on the monitoring device 15.

If the picture displayed on the monitoring device 15 is the desired picture, the user acts on an operating unit 19 of the storage unit 18 to designate recording of the picture.

This causes the controller 20 of the storage unit 18 to control the interfacing circuit 21 in order to fetch the picture data supplied from the picture processing block 12. The picture data fetched by the interfacing circuit 21 has the picture processing or working information appended thereto by the picture processing block 12, as described above. The system controller 20 fetches the picture processing information, from among the picture data and the picture processing information fetched via the interfacing circuit 21. The picture data is supplied to a buffer circuit 22.

The buffer circuit 22 amplifies the picture data at a pre-set gain and routes the amplified picture data to a raster block conversion circuit 23 and to a non-compression circuit 25. The non-compression circuit 25 directly transmits the picture data to a selector 29 as the picture data for high resolution without compression. The raster block conversion circuit 23 forms a compression block, made up of a pre-set number of pixels, as a unit for compression, and routes the compression block to a companding circuit 24. The companding circuit 24 performs two different types of compression, for example, two types of compression with different values of resolution. The compressions of the companding circuit 24 will form two compression blocks to form picture data with intermediate resolution and picture data with low resolution. The companding circuit 24 routes the resulting picture data to the selector 29.

The selector 29 is changed under control by a system controller 20. The picture data with high resolution, the picture data with intermediate resolution and the picture data with low resolution are routed via the selector 29 to an eight to-fourteen modulation (EFM) circuit 26 where the respective picture data is converted into a format suited to recording so as to be supplied to a disc recording/reproducing unit 27.

The disc recording/reproducing unit 27 appends the information concerning the respective picture data, such as the picture processing information or the printer control information, to the picture data of the respective values of resolution. The disc recording/reproducing unit 27 records the resulting data on the optical disc 28.

Specifically, the optical disc 28 is a magneto-optical disc 64 mm in diameter. The disc recording/reproducing unit 27 magneto-optically records picture data of low resolution on the inner peripheral area, picture data of high resolution on the outer peripheral area and picture data of intermediate resolution on an intermediate area between the inner peripheral area and the outer peripheral area.

Picture data of, for example, 200 still pictures can be recorded on the optical disc 28. The picture data corresponding to the 200 still pictures may be divided for supervision purposes into four albums, for example, each album consisting of 50 still pictures. Thus, when recording the picture data, the user selects, using the operating unit 19, the album on which the picture data is to be recorded. This causes the system controller 20 to control the disc recording/reproducing unit 27 to record the picture data supplied to the album selected by the user in the order in which they are fetched.

The picture data of low resolution is used as an index for displaying plural still pictures recorded in the album on the screen simultaneously. The picture data of intermediate resolution is used as index for displaying a desired one of the still pictures recorded in the album on the screen. The picture data of high resolution is recorded for use in printing.

The album names, the name of the pictures in each album, key-words for retrieving desired pictures and disc names may be entered in the storage unit 18.

The user acts on a write key provided on the operating unit 19 of the storage unit 18. The system controller 20 detects the write key being turned on and sets the write mode for entering the letter or character information.

The user then acts on an up/down key. Each time the up/down key is actuated, the system controller 20 display-controls a display unit 19a for sequentially displaying the letters or characters of the album names, key words and disc names. The user views the letters or characters displayed on the display unit 19a and determines what information is to be entered. The user acts on an EXEC key provided on the operating unit 19. This allows the system controller 20 to recognize the information which is now to be entered.

The user then acts on a ten-key key pad provided on the operating unit 19. The system controller 20 display-controls the display unit 19a for displaying the characters corresponding to the actuated keys. When the album name displayed on the display unit 19a is the desired album name, the user again acts on the EXEC key.

When the system controller 20 detects that the EXEC key is again actuated, it terminates the write mode. At the same time it controls the disc recording/reproducing unit 27 to record the input letter or character information, such as the album name, on the optical disc 28 in the so-called ASCII code.

Specifically, when the desired picture name is to be recorded, the user turns on the write key to set the system controller 20 to the write mode, while turning on the up/down key to designate the "name of the picture" which is now to be entered. The user then acts on the ten-key key pad to enter the name of the picture. This causes the system controller 20 to form the ASCII code associated with the entered letters or characters and to supply the ASCII code to the recording/reproducing unit 27. The disc recording/reproducing unit 27 accordingly records the ASCII code corresponding to the picture name on the optical disc 28.

The number of letters or characters that may be entered as the picture name is, for example, 16, while the number of letters or characters that may be entered as the album name is, for example, 32. The letters or characters may be entered as alphabetical letters, katakanas or kanjis. That is, 432 letters (16 letters×25 pictures and 32 letters for the album name) may be entered.

The operation of the still picture recording and/or reproducing system for reproducing the picture data and the letter or character data (ASCII code) recorded on the optical disc 28 for display on the monitoring device 15 is hereinafter explained.

In this case, the user first acts on an album key provided on the operating unit 19 of the storage unit 18. Each time the album key is turned on, the system controller 20 detects this and controls the disc recording unit 27 and the display unit 1 for reproducing and displaying the album name. Since four albums may be recorded on the optical disc 28, the four album names are sequentially displayed on the display unit 19a each time the album key is turned on.

The user then selects the desired one of the four albums and subsequently turns on the playback key. When the playback key is turned on, the system controller 20 detects this and controls the disc recording and reproducing unit 27 to reproduce the indexing picture data of low resolution for the selected album and the ASCII codes thereof (such as the album name, picture name and so forth).

Each album is made up of 50 still picture data, as explained previously. Although 25 still pictures may be simultaneously displayed on a display screen, the display area for each still picture is necessarily reduced, so that there is a risk that the desired still picture is difficult to select by the user. Thus the system controller 20 readout-controls the disc recording/reproducing unit 27 to read out the picture data for 25 pictures with low resolution, by one designation. This causes the disc recording/reproducing unit 27 to read out the picture data for low resolution, the ASCII code for the album names and the ASCII code for the picture names for the 25 still pictures from the inner peripheral side of the optical disc 27. The read-out picture data is supplied via the EFM circuit 26 and the selector 29 to the companding circuit 24, while the ASCII code is supplied via the EFM circuit 26, selector 29 and the noncompressing circuit 25 to the buffer circuit 22. The companding circuit 24 effectuates expansion for low resolution on the picture data and routes the expanded data to the raster block conversion circuit 23 and the buffer circuit 22. The buffer circuit 22 transiently stores the picture data and the ASCII code.

When the picture data and the ASCII code are stored in this manner in the buffer circuit 22, the DMAC controller 2a readout-controls the buffer circuit 22 so that the ASCII code stored in the buffer circuit 22 will be transferred at a high speed along with the picture data. This allows the ASCII code to be transferred to the frame memory 1 along with the picture data via the interfacing block 17 and the interfacing circuit 21 without the interposition of the frame memory 1.

Figure 15:
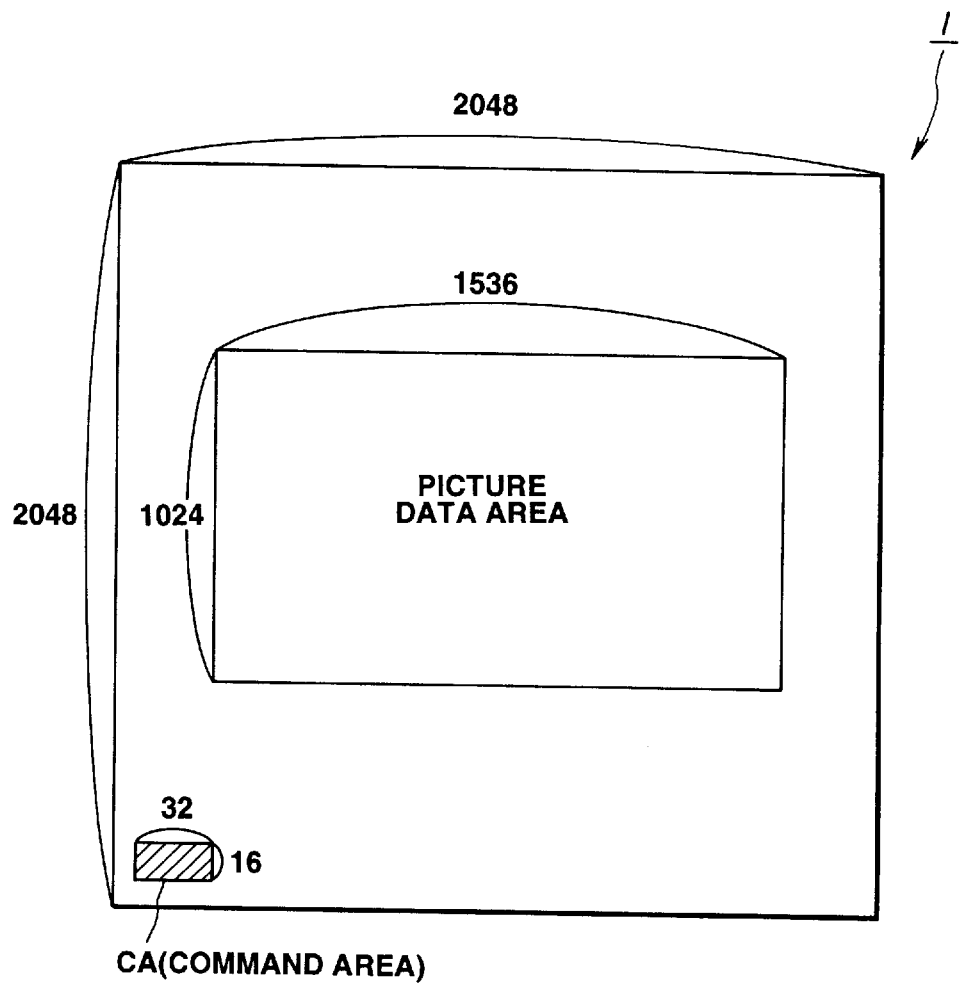
FIG. 15 illustrates allocation of the memory area of the frame memory.

The storage area for the frame memory 1 is made up of 2048 by 2048 pixels, as shown in FIG. 15. The fractional storage area of 1024 by 1536 pixels is a picture area for picture data (picture data area) while the remaining storage area of 16 by 32 pixels (512 bytes) is a command area CA which is a storage area for the ASCII codes.

When fed with the picture data and the ASCII data at a high speed from the buffer circuit 22, the memory controller 2 write-controls the picture data in the picture data area of the frame memory 1, while write-controlling the ASCII code in the command area CA.

Figure 16:
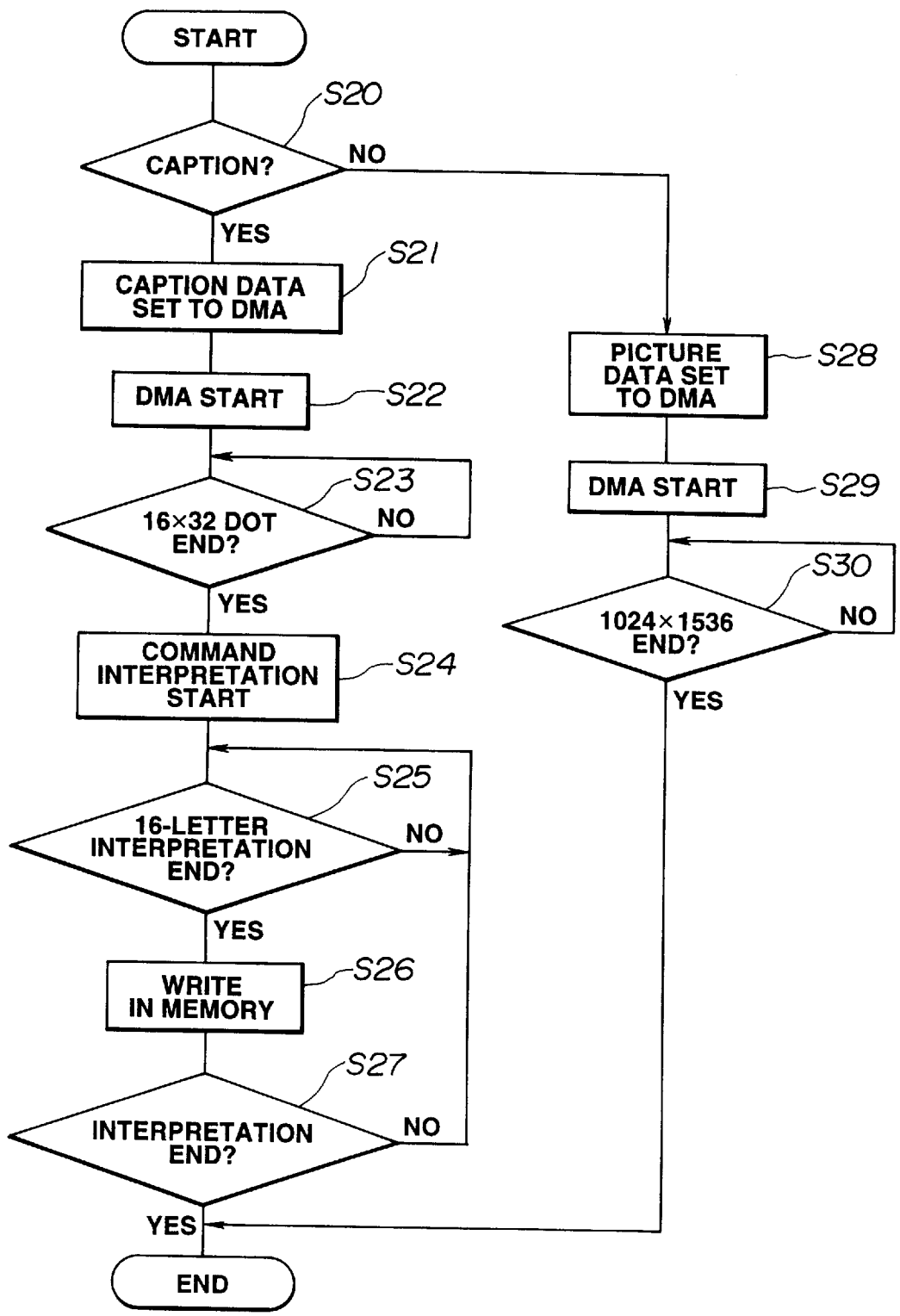
FIG. 16 is a flow chart for illustrating the operation of high-speed transfer of the command data along with the picture data in the still picture recording/reproducing system.

The operation of the still picture recording and/or reproducing system during transfer control of the picture data and the ASCII codes and the interpretation of the ASCII codes are shown in the flow chart shown in FIG. 16.

The flow chart of FIG. 16 is started at step S20 when the picture data readout is designated at the storage unit 18.

At step S20, the memory controller 2 judges whether or not the data to be transferred at a high speed is the picture data or the ASCII code. If the data is the ASCII code, the memory controller transfers to step S21 and, if the data is not ASCII code then to step S28.

At step S28, since the transferred data is the picture data, the memory controller 2 instructs the DMAC controller 2a to transfer the picture data, before transferring to step S29. At step S29, the DMAC controller 2a transfers the picture data stored in the buffer circuit 22 to the frame memory 1, before transferring to step S30.

At step S30, the memory controller 2 judges whether or not the picture data of 1024×1536 pixels have been written in the picture data area in the frame memory 1. If the result is NO, the operation of step S30 is repeated until the above picture 22 data has been written in the picture data area of the frame memory 1. If the result is YES, that is when the above picture data has been written in its entirety, and the program comes to a close.

If the data is found to be the ASCII code at step S20, the memory controller 2 transfers to step S21 and instructs the DMA controller 2a to transfer the ASCII code, before transferring to step S22.

At step S22, the DMAC controller 2a transfers the ASCII code stored in the buffer circuit 22 at a high speed to the frame memory 1 before transferring to step S23.

At step S23, it is judged whether or not the ASCII code has been written in its entirety in the command area CA of the frame memory 1. If the result is NO, the operation of step S23 is repeated until the ASCII code has been written in its entirety. If the result is YES, the memory controller transfers to step S24.

When the picture data and the ASCII code have been written in the respective areas of the frame memory 1, the memory controller 2 transfers to step S24 in order to read out the ASCII code written in the command area CA and to interpret the ASCII code, before transferring to step S25.

Figure 17:
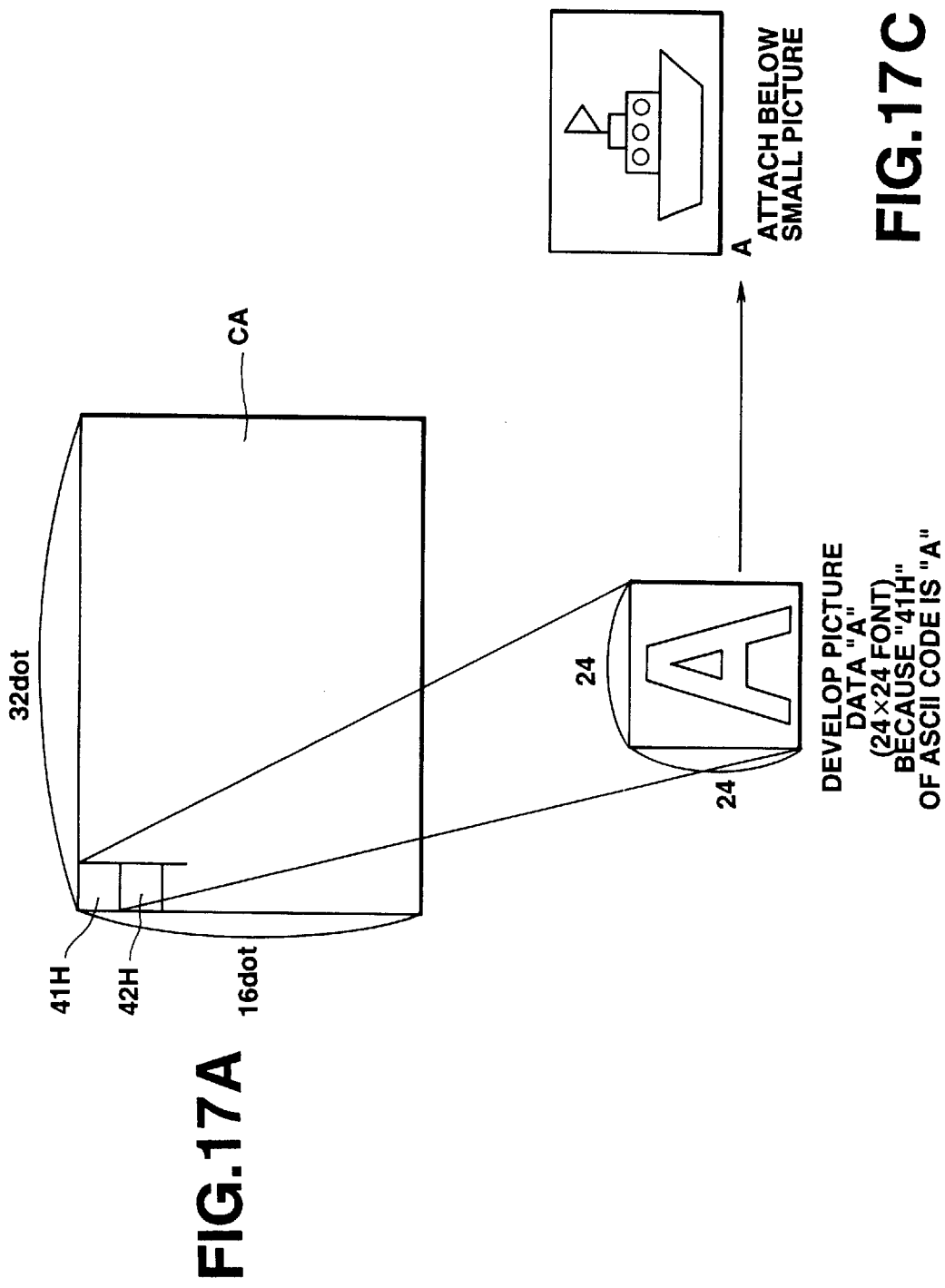
FIGS. 17A–C illustrate interpretation of the ASCII codes transferred at a high speed as command data along with the picture data; specifically

Specifically, the ASCII code read out from the command area CA of "41H", as shown in FIG. 17a, for example, denotes an alphabetical letter "A", as shown in FIG. 17b. Thus the memory controller 2 forms picture data for the letter "A" by e.g., 24×24 pixels, before transferring to step S25.

As explained above, a picture's name in 16 letters can be recorded for each picture recorded on the optical disc 28. Thus the memory controller 26 judges at step S25 whether or not the interpretation of the ASCII code has come to a close. If the result is NO, the step S25 is repeated until the interpretation of the 16-letter ASCII code comes to a close. If the result is YES, the memory controller transfers to step S26.

At step S26, the memory controller 2 write-controls the frame memory 1 so as to write picture data, which the memory controller 2 has generated by conversion from the ASCII code after interpretation as described above, at a portion corresponding to the bottom surface of each picture (FIG. 17C) in the frame memory 1. The memory controller 2 then transfers to step S27.

At step S27, the memory controller 2 judges whether or not interpretation of all of the ASCII codes stored in the command area AC has come to a close. If the result is NO, then step S27 is repeated until the interpretation of all of the ASCII codes comes to a close. If the result is YES, the program directly comes to a close.

After the writing of the picture data and the picture data indicating the letters of the ASCII codes, both referred to hereinafter collectively as "picture data," has come to a close. The memory controller 2 readout-controls picture data written in the frame memory 1. The picture data is converted by the D/A converter 14 into analog picture signals which are routed to the monitoring device 15.

Figure 18:
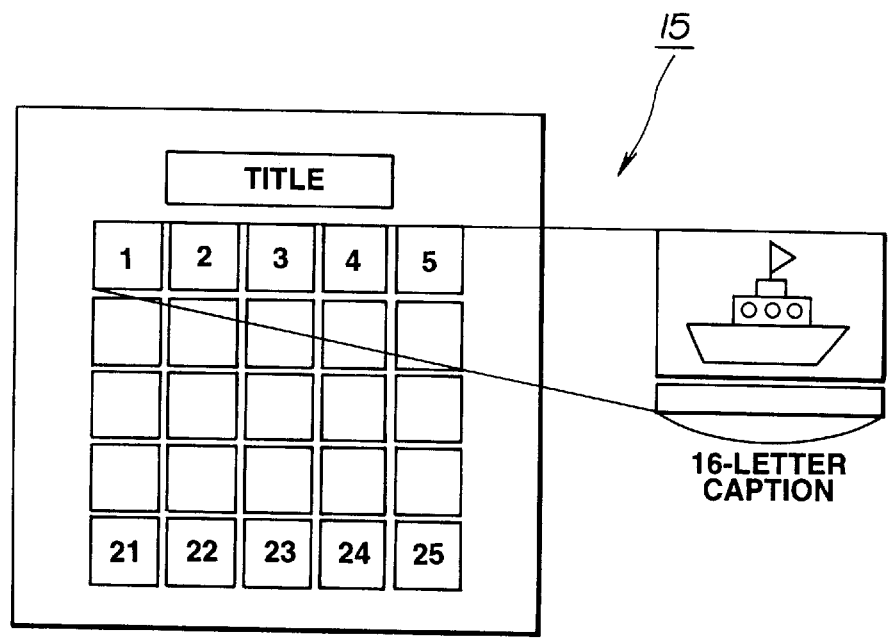
FIG. 18 illustrates the manner in which the ASCII codes are interpreted and displayed on a display screen of the monitor device.

This causes 25 indexing pictures and the name of the pictures to be displayed along with the title of the selected album on a display screen of the monitoring device 15, as shown in FIG. 18.

If the user desires to display the remaining 25 pictures of the selected album, he or she acts on the operating unit 19 for designating the display of the remaining 25 pictures. This causes the system controller 20 to control the disc recording and/or reproducing apparatus 27 to reproduce the picture data and the ASCII codes of the remaining 25 pictures. Thus the picture data and the ASCII codes for the remaining 25 pictures of low resolution are transferred at a high speed as described above for displaying the remaining 25 pictures on the monitoring device 15.

By serially transmitting the letter data indicating the picture name or the title of the album as ASCII codes along with the picture data, a large quantity of picture data may be transferred at a time without increasing the number of interconnections, as with parallel transmission. In addition, since the transmission of the picture data and the ASCII codes is performed by the DMAC controller 2a without interposition of the CPU 8, high-speed transfer may be achieved for shortening the data transfer time.

On the other hand, since the DMA controller 2a effectuates the above high-speed transfer, the CPU 8 is not exclusively occupied in transferring the picture data and the ASCII codes. Thus, during transmission of the picture data and the ASCII code, the CPU 8 may be employed for data processing other than the transmission of the picture data and the ASCII code. As a result, an inexpensive CPU having an ordinary processing speed may be employed as the CPU 8. Consequently, the still picture recording and/or reproducing system may be lowered in cost through cost reduction of the CPU 8.

The present inventors have conducted an experiment on a still picture recording and/or reproducing system manufactured for trial, and found that picture data and the ASCII codes can be transferred at a higher speed of approximately 2 msec and 130 $\mu$sec at the maximum from the buffer circuit 22 of the storage unit 18 to the frame memory 1. Thus the operation from transfer until interpretation can be completed in approximately 34 ms, which means significant improvement over the conventional time of not less than 1 sec. In conventional practice, interpretation of the ASCII code usually takes 32 msec.

The reason the time of approximately 32 msec is involved in interpreting the ASCII code is that the frame memory 1 and the CPU 8 are constituted independently of each other. That is, an experiment conducted by the present inventors on the frame memory 1 put on a memory map of the CPU 8 has revealed that the time involved in the interpretation of the ASCII code could be reduced to 3 msec, such that the time involved from transfer until interpretation could be reduced to 3 msec, thus achieving further improvement.

In the above description, it is the ASCII code that is transferred at a high speed along with the picture data. However, the command data designating control of the respective parts may also be transferred with the picture data. That is, when transferring the command data from the storage unit 18 to the CPU 8, the command data is transferred at a high speed along with the picture data so as to be transiently stored in the command area CA. The CPU 8 reads out the command data from the command area CA and executes the commands. Conversely, when transferring the command data from the CPU 8 to the storage unit 18, the command data is transferred along with the picture data to the frame memory 1 for storage transiently in the command area CA. When the system controller 20 outputs a command data transfer request, the memory controller 2 is responsive thereto to control the DMAC controller 2a to effect high-speed transfer of the command data stored in the command area CA. The system controller 20 effects control responsive to the command data transferred at a high speed.

Thus it is possible with the still picture recording and/or reproducing system to effect high-speed bidirectional transfer of the command data.

Next, when the 25 pictures are displayed on the monitoring device 15, the user acts on the operating unit 19 in order to select a desired one of the displayed pictures.

When the operating unit 19 is acted upon for designation of the desired picture, the system controller 20 detects it and readout-controls the disc recording and/or reproducing unit 27 to read out picture data of intermediate resolution corresponding to the selected picture. Thus the disc recording and/or reproducing unit 27 reads out the picture data of intermediate resolution stored in the intermediate area of the optical disc 28 for display and transmits the read-out picture data to the companding circuit 24 via the EFM circuit 26 and the selector 29.

The companding circuit 24 performs expansion for intermediate resolution on the picture data and transmits the expanded picture data to the interfacing block 17 via the raster block conversion circuit 23, buffer circuit 22 and the interfacing circuit 21.

When the picture data for intermediate resolution is supplied to the interfacing block 17, the system controller 2 causes the picture data to be stored transiently in the frame memory 1 and to be subsequently read out therefrom and routed to the D/A converter 14. The D/A converter 14 converts the picture data of the intermediate resolution into analog data to form picture signals for intermediate resolution which are supplied to the monitoring device 15. Thus, the picture selected by the user is displayed on the display screen of the monitoring device 15.

Next, it becomes possible with the still picture recording and/or reproducing system to select the desired picture for display on the monitoring device 15 without displaying the indexing picture.

That is, when the user is aware of the album in which the desired picture is recorded, and the picture number, he or she acts on a ten-key key pad provided on the operating unit 19 of the storage unit 18 in order to designate the album and the picture number.

Since 50 pictures may be recorded in each album as explained above, the user enters the desired picture number by the ten-key key pad for selecting the desired picture. After selection of the desired picture number, the user turns on the playback key.

On detecting that the playback key has been turned on, the system controller 20 controls the disc recording/reproducing unit 27 in order to read out the picture data of the picture number of the designated album. Thus the picture data of the designated picture number is read out from the optical disc 29 so as to be supplied to and displayed on the monitoring device 15.

Such selection of the desired picture may also be made using a retrieval key provided on the operating unit 19. That is, when the retrieval key is turned on, the system controller 20 is set to the retrieval mode. When set to the retrieval mode, the system controller 20 display-controls the display unit 19a to sequentially display the letters or characters for the picture name, key words, recording date and the recording time each time the up/down key is actuated. When the user has selected the input information from among the picture name, key word, recording data and the recording time, he or she enters the name of the picture to be retrieved, key word, recording date or the recording time, using the ten-key key pad, and turns on the EXEC key.

Thus, the system controller 20 detects the turning on of the EXEC key and starts the retrieval operation. The system controller 20 display-controls the display unit 1a for displaying the album number and title of the retrieved picture and picture name and number on the display unit 19a. If there are plural pertinent pictures, the system controller display-controls the display unit 19a in order to display the list of the pictures.

Then the user selects the desired picture, from among the names of the pictures displayed on the display unit 19a, using the up/down key, and then turns on the playback key.

When the playback key is turned on, the system controller 20 detects this and controls the disc recording and/or reproducing apparatus 27 for reproducing the picture data of the selected picture.

This causes the designated picture data to be read out from the optical disc 28 so as to be supplied to and displayed on the monitoring device 15.

The operation of the still picture recording and/or reproducing system when printing the picture fetched via the scanner 10 or the video input unit 11 or printing the picture recorded on the optical disc 28 is hereinafter explained.

When printing a picture fetched via the scanner 10 or the video input unit 11, the user acts on the operating unit 13 for displaying the picture fetched via the scanner 10 or the video input unit 11 on the monitoring device 15. If the picture displayed on the monitoring device 15 is the desired picture, the user acts on the operating unit 13 to designate the printing of the picture.

The picture data fetched via the scanner 10 or the video input unit 11 is stored in the frame memory 1 of the picture processing block 12. Thus, when the printing is designated, the CPU 8 readout-controls the frame memory 1 to read out the picture data stored in the frame memory 1. The picture data read out from the frame memory 1 is supplied to a data conversion circuit 16a of the printer unit 16.

The data conversion circuit 16a effectuates data conversion suited to printing on the picture data read out from the frame memory 1. That is, if the picture data is supplied as R, G or B or as Y, Cr and Cb, the conversion circuit converts the picture data into yellow (Y), magenta (M) and cyan (C) by color coordinate conversion to form picture data for printing. The converted picture data is supplied to a thermal head 16b.

The thermal head 16b causes a picture corresponding to the picture data to be printed at approximately 300 DPI on, for example, an A6 size printing sheet 16c. This permits printing of a picture corresponding to the picture data fetched via the scanner 10 or the video input unit 11.

When printing a picture recorded on the optical disc 28, the user causes the indexing picture recorded on the optical disc 28 to be displayed on the monitoring device 15 by the procedure described previously. The user then selects a desired one of the indexing pictures. Thus, the selected picture is displayed on the monitoring device 15.

If the picture displayed on the monitoring device 15 is the desired picture, the user acts on the operating unit 13 in order to designate the printing of the picture. This allows the CPU 8 to form and output printing control data designating the readout for printing of the picture data currently displayed on the monitoring device. The printing control data is supplied via the picture processing block 12 and the interfacing block 17 to the interfacing circuit 21 so as to be supplied via the interfacing circuit 21 to the system controller 20. In the optical disc 28, the indexing picture data of low resolution, the picture data of intermediate resolution for monitor display and the picture data of high resolution for printing are stored, as explained previously.

When fed with the printing control data, the system controller 20 controls the disc recording and/or reproducing unit 27 to read out for printing picture data of high resolution designated by the printing control data. Thus the picture data of high resolution corresponding to the picture displayed on the monitoring device 15 is read out from the optical disc 28. Since the picture data of high resolution is not compressed during recording, it is supplied via the non-compression circuit 25 to the buffer circuit 22 so as to be supplied to the data conversion circuit 16a of the printer unit 16 via the interfacing circuit 21, interfacing block 17 and the picture processing block 12.

The data conversion circuit 16a effectuates data conversion suited to printing on the picture data of high resolution and transmits the resulting converted data to the thermal head 16b. This allows pictures corresponding to the picture data read out form the optical disc 28 to be printed on the printing sheet 16c.

It is possible with the picture processing block 12 of the still picture recording and/or reproducing system to process the picture data fetched via the scanner 10 or the video input unit 11 with enlargement, contraction rotation or dissolution for display on the monitoring device 15, recording on the optical disc 28 or printing at the printer unit 16. It is also possible to reproduce the picture data recorded on the optical disc 28 to effect the above picture processing for recording on the monitoring device 15, re-recording on the optical disc 28 or printing at the printing unit 16.

The picture data from the scanner 10, video input unit 11 or the storage unit 18 is supplied to a first bus selector 6 shown in FIG. 2.

When the user acts on the operating unit 13 to designate the device to fetch the picture data, that is, the above-mentioned scanner 10, video input unit 11 or the storage unit 18, the CPU 8 detects this. In response, the CPU 8 changeover-controls the first bus selector 6 for selecting the input of the designated device. The picture data via the first bus selector 6 is supplied via the arithmetic circuit 4 to the frame memory 1.

Figure 3A:
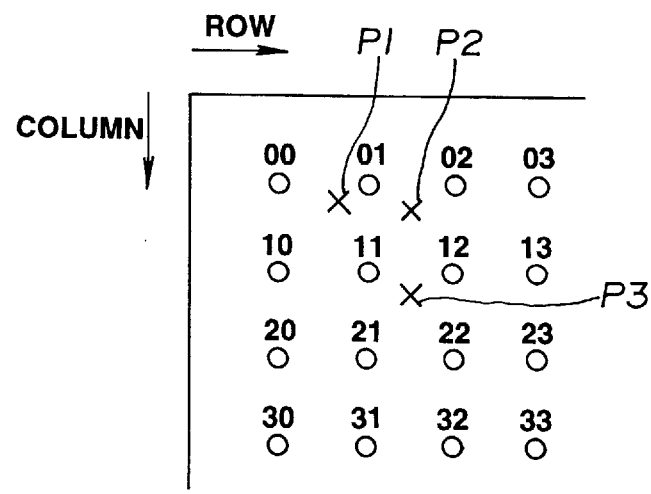
FIG. 3A illustrates a portion of the frame memory storing pixel data.
Figure 3B:
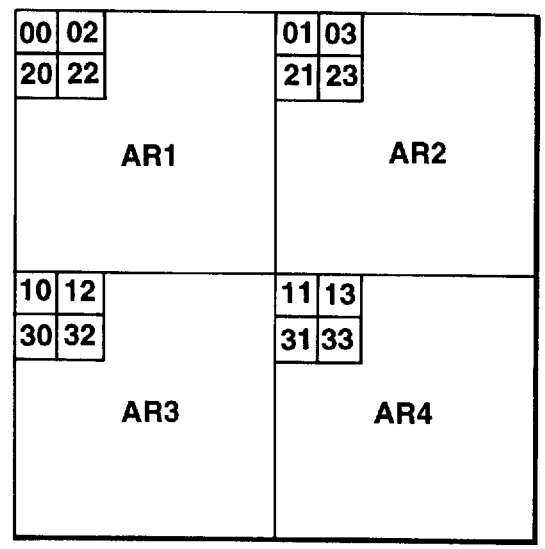
FIG. 3B illustrates how the frame memory of FIG. 1 is divided into four storage areas.

The frame memory 1 has its inside divided into first through fourth storage areas AR1 to AR4, as shown in FIG. 3b. When the picture data having pixels 0 as shown in FIG. 3a is supplied, the CPU 8 write-controls the frame memory 1 via the memory controller 2 so that the neighboring pixels are stored in different recording areas, as shown in FIG. 3b. In FIG. 3a, 00, 01, 02, . . . indicate addresses of the pixels, with the first figures indicating the row and the second figure indicating the column. That is, "0", "11" and "12" indicate the addresses for a pixel of row 0 column 0, a pixel of row 1 column 1 and a pixel of row 1 column 2, respectively.

Specifically, among the picture data supplied to the frame memory 1, picture data of pixels having the addresses 00, 02, 20, 22, . . . are written in the first storage area AR1, while picture data of pixels having the addresses 01, 03, 21, 23 . . . are written in the second storage area AR2, as shown in FIG. 3b. Similarly, picture data of pixels having the addresses 10, 12, 30, 32 . . . are written in the third storage area A 3, while picture data of pixels having the addresses 11, 13, 31, 33, . . . are written in the fourth storage area AR4.

Figure 3C:
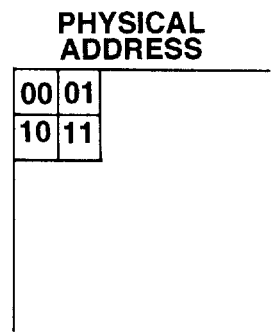
FIG. 3C shows the physical addresses for the four areas of FIG. 3B shown independently stored.

The picture data written in the respective storage areas AR1 to AR4 are adapted to be separately read from the storage areas AR1 to AR4, with the physical addresses of the storage areas AR1 to AR4 being independent from each other as shown in FIG. 3c. Thus, even if the write control is performed so that neighboring pixels are written in different recording areas, the pixels are sequentially read from the address 00 for each of the storage areas AR1 to AR4.

If the desired picture data is fetched in this manner into the frame memory 1, it becomes possible to process the picture data.

For electrical zooming for enlarging or contracting the picture data, the user turns on a plus (+) key or a minus (−) key provided on the operating unit 13. The electronic zooming is designed so that the multiplication factor is gradually increased or decreased in proportion to the time the plus key or the minus key is continuously turned on. Thus, the CPU 2 detects the time the plus key or the minus key has been turned on and calculates the multiplication factor for still picture enlargement or contraction based upon the time the plus key or the minus key is turned on without interruption.

Figure 4:
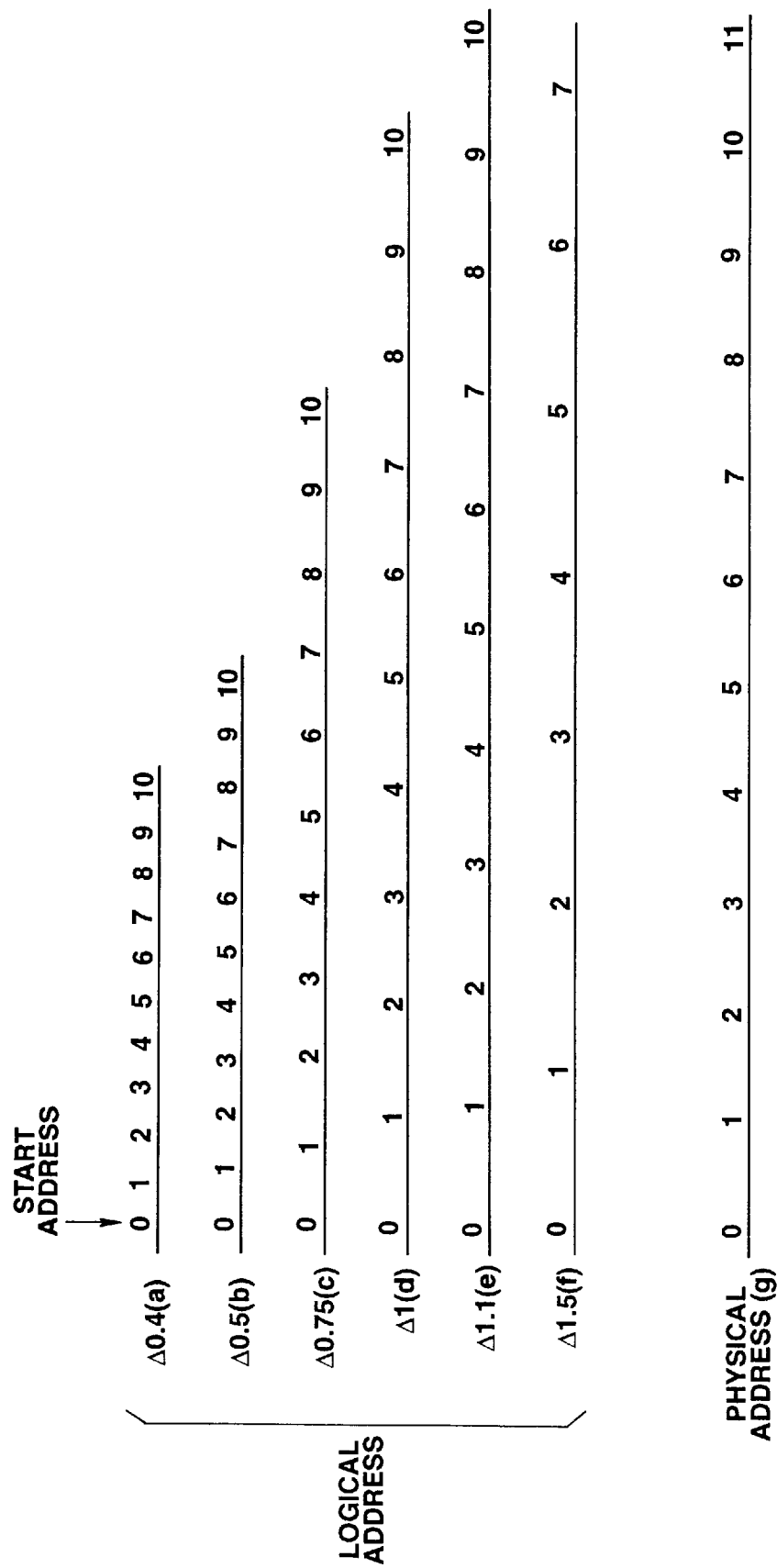
FIG. 4 illustrates values of increment and decrement of the logical address associated with picture enlargement and contraction.

Referring to FIG. 4, if the enlargement by a factor of 1.1 is designated (Δ1.1), the CPU 8 forms address data (delta address) indicating an increment value when the readout address of Δ1 is enlarged by a factor of 1.1, as shown at FIG. 4(e), with the readout address for an equimultiple (Δ1) shown at FIG. 4(d) as a reference. The CPU 8 transmits the delta address via the memory controller 2 to an address generating circuit 3 shown in FIG. 1. If the enlargement of 1.5 is designated to (Δ1.5), the CPU 8 forms address data (delta address) indicating an increment value when the readout address of Δ1 is enlarged by a factor of 1.5, as shown at FIG. 4(f). The CPU 8 transmits the delta address via the memory controller 2 to an address generating circuit 3 shown in FIG. 1.

If the contraction by a factor of 0.4 is designated, the CPU 8 forms the delta address indicating the decrement value (value of decrement) of the readout address when the equimultiple readout address is contracted by a factor of 0.4, as shown at FIG. 4(a). If the contraction by a factor of 0.5 is designated, the CPU 8 forms the delta address indicating the value of decrement of the readout address when the equimultiple readout address is contracted by a factor of 0.5, as shown at FIG. 4(b). Similarly, if the contraction by a factor of 0.75 is designated, the CPU 8 forms the delta address indicating the value of decrement of the readout address when the equimultiple readout address is contracted by a factor of 0.75, as shown at FIG. 4(c). The CPU 2 transmits these delta addresses via the memory controller 2 to the address generating circuit 3 shown in FIG. 1.

The above delta address represents changes in the logical address in case of enlargement or contraction operations. The picture data read out from the physical address shown in at FIG. 4(g) is processed in accordance with the logical address in order to form picture data associated with the logical address.

That is, the CPU 8 forms the delta address responsive to the multiplication for enlargement or contraction, while also forming the start address showing the readout start address for the portion of the still picture to be enlarged or contracted and transmits the delta address and the start address via the memory controller 2 to the address generating circuit 3 shown in FIG. 1.

Figure 5:
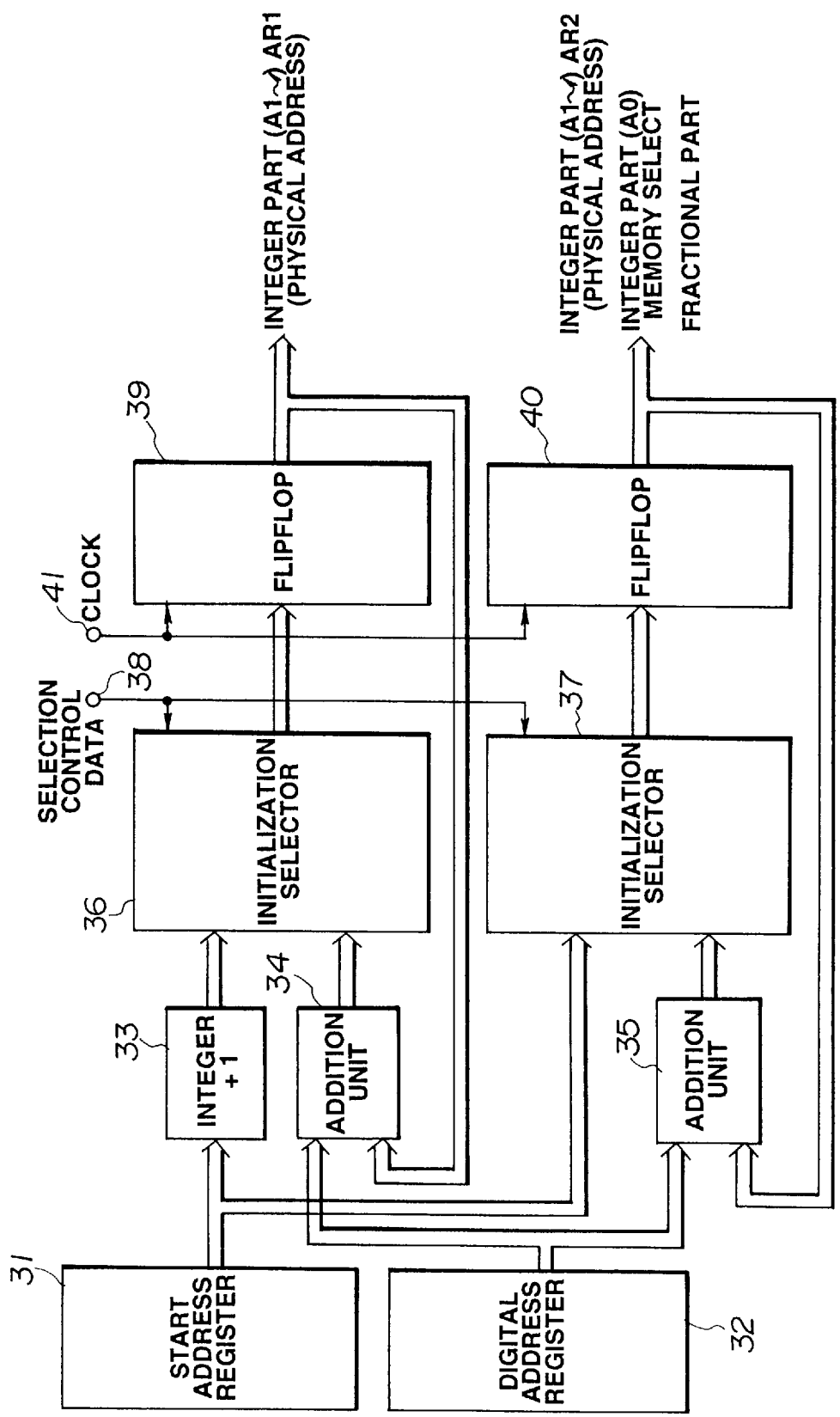
FIG. 5 is a block diagram of an address generating circuit provided in the picture processing block.

A readout address former of the address generating circuit 3 for the rows of the storage areas AR1 and AR2 is configured as shown in FIG. 5. The start address and the delta address supplied from the CPU 8 are temporarily stored in a start address register 31 and in a delta address register 32, respectively.

A readout address former for the rows of the storage areas AR3 and AR4 is configured similarly to the readout address former for the rows of the storage areas AR1 and AR2. The readout address former for the columns of the storage areas AR1 and AR2 and the readout address former for the columns of the storage areas AR3 and AR4 are configured similarly to the readout address former shown in FIG. 5.

The start address stored in the start address register 31 is supplied to an integer addition unit 33 and to an initialization selector 37. The delta address supplied to the delta address register 32 is supplied to addition units 34 and 35.

If, when effectuating enlargement or contraction operations, a pixel under consideration P1 shown by x in FIG. 3a is to be formed, calculations are made by the arithmetic-logical circuit 4 using four pixels neighboring the pixel under consideration P1. The pixels neighboring the pixel under consideration P1 are stored in different storage areas AR1 to AR4 of the frame memory 1. For calculating the pixel under consideration, it is necessary for the respective pixels read out from the storage areas AR1 to AR4 to have a certain chronological sequence by reason of arithmetic-logical operation performed by the arithmetic-logical circuit 4 as explained subsequently. Thus the address generating circuit 3 is controlled to output a temporally forward readout address a pre-set amount.

That is, the integer addition unit 33 adds "1" to the start address and transmits the result to the initialization selector 36. Thus, if "0" is set as the start address, the initialization selector 36 is fed with the addresses in the sequence of 1, 2, 3 . . . , as shown in FIG. 6A, while the initialization selector 37 is fed with the addresses in the sequence of 0, 1, 2 . . . , as shown in FIG. 6B.

Figure 6:
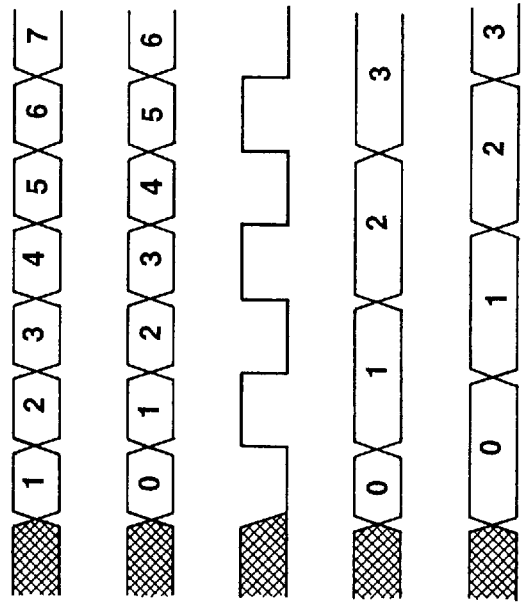
FIGS. 6A–6E are timing charts for illustrating address data for respective storage areas generated by the address generating circuit; specifically

Each of the initialization selectors 36, 37 is fed via an input terminal 38 with the common selection control data which is inverted at a timing in which a new address is supplied to the initialization selectors 36, 37, as shown in FIG. 6C.

The initialization selector 36 routes an address to a flipflop 39 only when it is fed with a high level selection control data signal. Conversely, the initialization selector 37 routes an address to a flipflop 40 only when it is fed with a low level selection control data signal.

The flipflops 39, 40 are adapted to latch the addresses based on the clocks supplied via an input terminal 41. The flipflop 39 outputs the latched data during the time from the rising of a pulse of the selection control data shown in FIG. 6C the rise of the next pulse as shown in FIG. 6D. The flipflop 40 outputs the latched data during the time since the decay of a pulse of the selection control data until decay of the next pulse as shown in FIG. 6E. Thus the temporally forward readout pulse can be outputted a pre-set amount as shown in FIG. 6D and 6E.

The addresses outputted by the flipflops 39, 40 are fed back to addition units 34, 35, respectively.

The addition unit 34 adds the address fed back from the flipflop 39 to the delta address indicating the values of increment or decrement as set depending on the multiplication factor for enlargement or contraction, thereby forming the readout address for the storage area AR1 responsive to the multiplication factor for enlargement or contraction, and transmits the readout address thus formed to the initialization selector 36 and the flipflop 39.

Similarly, the addition unit 35 adds the address fed back from the flipflop 40 to the delta address fed back from the flipflop 40 for forming the readout address for the storage area AR2 responsive to the multiplication factor for enlargement or contraction and transmits the readout address thus formed to the initialization selector 37 and the flipflop 40.

Figure 7:
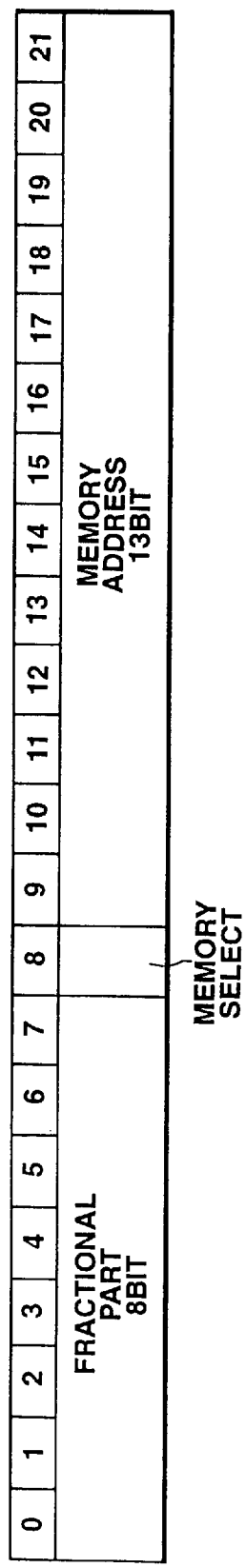
FIG. 7 illustrates a format for the address data.

By the repetition of the above operations, the flipflops 39, 40 output the readout addresses added to by the delta addresses. The readout address is outputted as 22-bit data as shown in FIG. 7. Of the 22 bits, the zero-th to seventh bits represent data for the fractional part indicating values of address increment or decrement corresponding to the multiplication factors for enlargement or contraction. The eighth bit is the memory selection data for selecting the storage areas AR1 to AR4. The ninth to 21st bits are memory addresses indicating the addresses of existing pixels.

On the other hand, the fractional part data is made up of a horizontal coefficient (KH) and a vertical coefficient (KV) respectively indicating the values of increment or decrement in the horizontal direction for the address and the values of increment or decrement in the vertical direction for the address.

The above memory addresses are routed to the storage areas AR1 to AR4 represented by the memory selection data, while the fractional part data is routed to the arithmetic-logical circuit 4, as shown in FIG. 1.

When calculating the pixel under consideration P1 in FIG. 3A, it is necessary to read out picture data of pixels having addresses 00, 01, 10 and 11. The picture data of the pixels having addresses 00, 01, 10 and 11 are stored in their entirety at the address 00 of the storage areas AR1 to AR4, as shown in FIG. 3B.

Thus, in such case, the memory address 00 is formed for each of the storage areas AR1 to AR4 in the address generating circuit 3 so as to be supplied to the storage areas AR1 to AR4 of the frame memory 1.

Similarly, when calculating the pixel under consideration P2 indicated by x in FIG. 3A, it is necessary to read out picture data of pixels having addresses 00, 02, 11 and 12. The picture data of the pixel having the address 01 is stored at the address 00 of the storage area AR2, and the picture data of the pixel having the address 02 is stored at the address 01 of the storage area AR1, while the picture data of the pixel having the address 11 is stored at the address 00 of the storage area AR4, and the picture data of the pixel having the address 12 is stored at the address 01 of the storage area AR3, as shown in FIG. 3B.

Thus, in such case, the memory addresses 01, 00, 01, 00 for the memory areas AR1 to AR4 are formed in the address generating circuit 3 so as to be supplied to the storage areas AR1 to AR4 of the frame memory 1.

Similarly, when calculating the pixel under consideration P3 indicated by x in FIG. 3A, it is necessary to read out picture data of pixels having addresses 11, 12, 21 and 22. The picture data of the pixel having the address 11 is stored at the address 00 of the storage area AR4, and the picture data of the pixel having the address 12 is stored at the address 01 of the storage area AR3, while the picture data of the pixel having the address 21 is stored at the address 10 of the storage area AR2, and the picture data of the pixel having the address 22 is stored at the address 11 of the storage area AR1, as shown in FIG. 3B.

Thus, in such case, the memory addresses 11, 10, 01, 00 for the memory areas AR1 to AR4 are formed in the address generating circuit 3 so as to be supplied to the storage areas AR1 to AR4 of the frame memory 1.

When the memory addresses are supplied in this manner to the frame memory 26, picture data is read from the addresses designated by the memory addresses of the storage areas AR1 to AR4 so as to be supplied to the arithmetic-logical circuit 4.

Figure 8A:
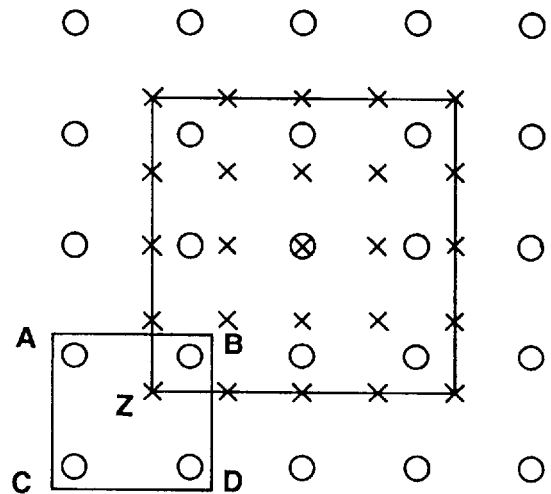
FIGS. 8A and 8B illustrate arithmetic-logical operations for enlargement and contraction of the arithmetic-logical circuit provided in the picture processing block; specifically.

The arithmetic-logical circuit 4 calculates picture data of a picture, made up of pixels shown by x in FIG. 8A, based upon picture data of a picture made up of pixels indicated at 0 in FIG. 8A and fractional part data (KH, KV) indicating the values of address increment or decrement formed responsive to the multiplication factor for enlargement or contraction, as read from the storage areas AR1 to AR4 of the frame memory 1.

Figure 8B:
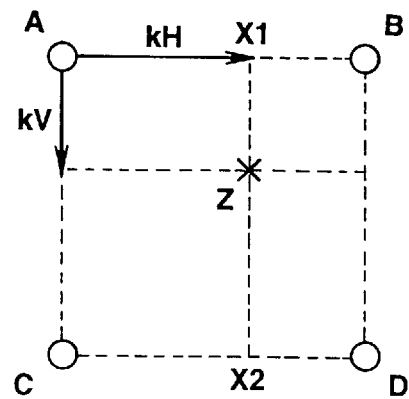

That is, when calculating picture data of a pixel "Z", one of virtual pixels involved in enlargement or contraction, as shown in FIG. 8A, the arithmetic-logical circuit 4 detects four pixels A to D around the pixel "Z", as shown in FIG. 8B.

Then, as shown in FIG. 8B, the pixels A and B are interpolated, based on the horizontal coefficient (KH) indicating the values of horizontal address increment or decrement, for detecting a pixel X1. The pixels C and D are interpolated, based on the vertical coefficient (KV), for detecting a pixel X2. The pixels X1 and X2 are then interpolated, using the vertical coefficient KV, for calculating picture data for the pixel "Z".

The above arithmetic-logical operations are carried out in accordance with the following equations:

$$X1 = A(1-KH) + KHB \quad (1)$$
$$= A + KH(B-A)$$

$$X2 = C(1-KH) + KHD \quad (2)$$
$$= C + KH(D-C)$$

$$Z = (1-KV) + KVX2 \quad (3)$$
$$= X1 - KV(X2 - X1)$$

Figure 9:
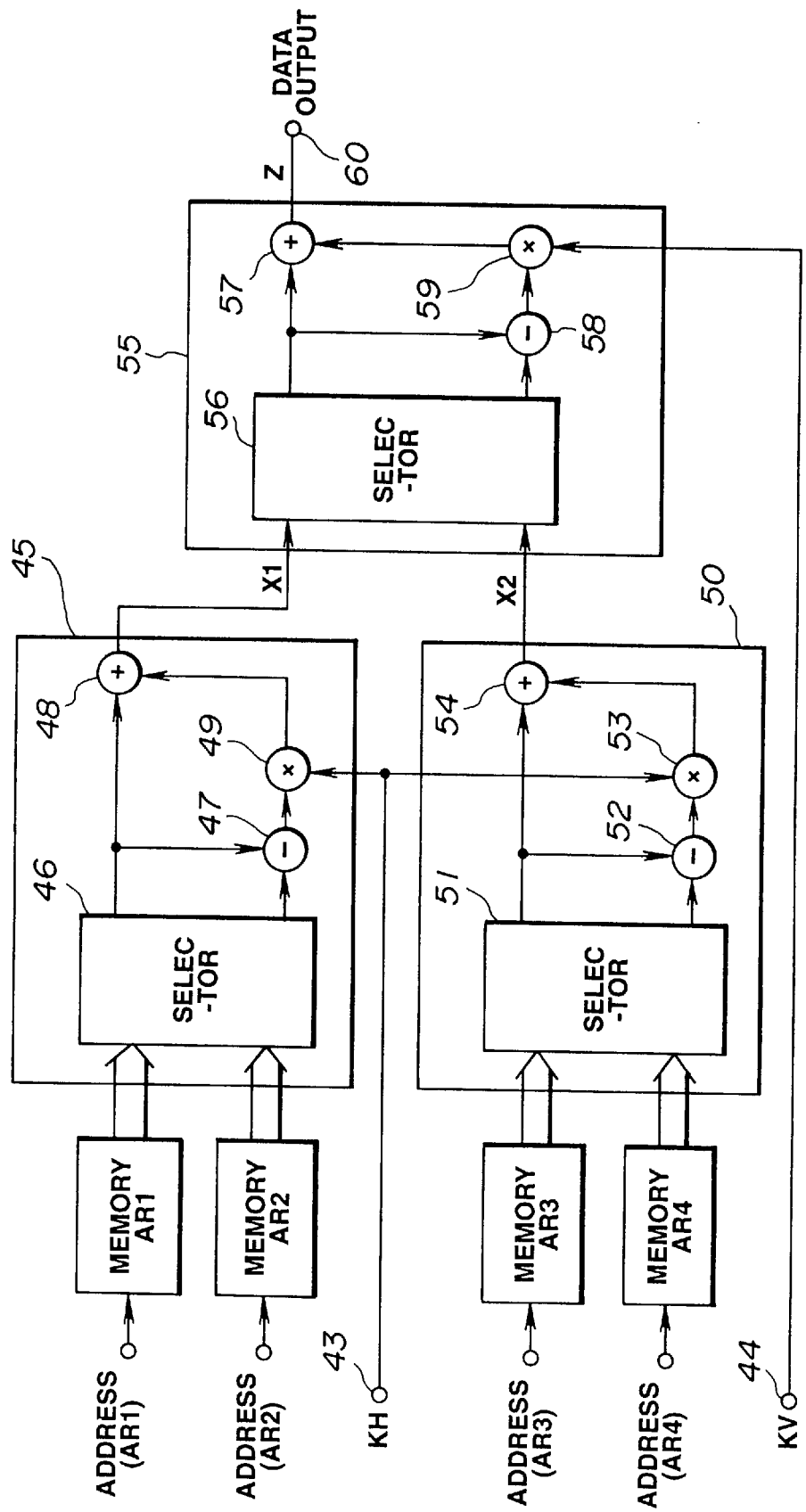
FIG. 9 is a block diagram of the arithmetic-logical circuit.

Thus the arithmetic-logical circuit 4 is arranged for executing the above arithmetic-logical operations, and has a first arithmetic-logical unit 45 for performing the operation of the equation (1), a second arithmetic-logical unit 50 for performing the operation of the equation (2) and a third arithmetic-logical unit 55 for performing the operation of the equation (3), as shown in FIG. 9.

The arithmetic-logical units 45, 50 and 55 are of the same constitution and each made up of a selector, an additive node, a subtractive node and a multiplier.

Referring to FIG. 9, if picture data of the pixels A and B are read from the first storage area AR1 and the second storage area AR2 of the frame memory 1, the picture data of the pixels A and B are routed to the selector 46 of the first arithmetic-logical unit 45. The selector 46 routes the picture data of the pixel A to the additive node 48 and the subtractive node 47, while routing picture data of the pixel B to the subtractive node 47.

The subtractive node 47 subtracts picture data for the pixel A from the picture data of the pixel B and routes the difference (B−A) to the multiplier 49 which is fed with the horizontal coefficient KH via an input terminal 43. The multiplier 49 multiplies the subtraction data from the subtractive unit 47 with the horizontal coefficient KH to transmit the resulting product KH(B−A) to the additive node 48. The additive node 48 adds the picture data of the pixel A from the selector 46 to the multiplication data from the multiplier 49 to transmit the resulting sum (A+KH(B−A)) of the equation (1) as picture data for the pixel X1 to the selector 56 of the third arithmeticlogical unit 55.

If picture data of the pixels C and D are respectively read from the third storage area AR3 and the fourth storage area AR4 of the frame memory 1, the picture data of the pixels C and D are routed to the selector 51 of the second arithmetic-logical unit 50. The selector 51 transmits the picture data of the pixel C to the additive node 54 and the subtractive node 52, while transmitting picture data of the pixel D to the subtractive node 52.

The subtractive node 52 subtracts picture data for the pixel C from the picture data of the pixel D and routes the difference (D−C) to the multiplier 53 which is fed with the horizontal coefficient KH via an input terminal 43. The multiplier 53 multiplies the subtraction data from the subtractive unit 52 with the horizontal coefficient KH to transmit the resulting product KH(D−C) to the additive node 54. The additive node 54 adds the picture data of the pixel C from the selector 51 to the multiplication data from the multiplier 53 to transmit the resulting sum (C+KH(D−C)) of the equation (2) as picture data 45 for the pixel X2 to the selector 56 of the third arithmetic-logical unit 55.

The selector 56 of the third arithmetic-logical unit 55 transmits the picture data of the pixel X1 to the additive node 57 and the subtractive node 58, while transmitting the picture data of the pixel X2 to the subtractive node 58.

The subtractive node 58 subtracts picture data for the pixel X1 from the picture data of the pixel X2 and transmits the difference (X2−X1) to the multiplier 59 which is fed with the vertical coefficient KV via the input terminal 54. The multiplier 59 multiplies the subtraction data from the subtractive unit 58 with the vertical coefficient KV to transmit the resulting product K (X2−X1) to the additive node 57. The additive node 57 adds picture data of the pixel X1 from the selector 56 to the multiplication data from the multiplier 59 to transmit the resultant data X1+KV(X2−X1) of the equation (2) as picture data for the pixel Z corresponding to the enlargement or contraction at an output terminal 74.

The picture data thus formed by the arithmetic-logical operations are supplied as a 24 bit picture data to the color adjustment circuit 5.

The color adjustment circuit 5 (shown in FIG. 2) is made up of, for example, a matrix processing circuit and a color pallet unit constituted by an SRAM and effectuates color tone conversion on the picture data from the arithmetic-logical circuit 4 to transmit the resulting picture data to the second bus selector 7.

The second bus selector 7 is adapted to be changeover-controlled by the CPU 8 depending on the device selected by the user. Thus, if the monitoring device 15 is selected by the user as an output destination of the enlarged or contracted picture data, the CPU 8 changeover-controls the second bus selector 7 for supplying the picture data to the monitoring device 15. This allows the enlarged or contracted still picture to be displayed on the monitoring device 15.

On the other hand, if the storage unit 18 is selected by the user as an output destination of the enlarged or contracted picture data, the CPU 8 changeover-controls the second bus selector 7 for supplying the picture data to the storage unit 18. This allows the enlarged or contracted still picture to be recorded in the storage unit 18.

If the printer unit 16 is selected by the user as an output destination of the enlarged or contracted picture data, the CPU 8 changeover-controls the second bus selector 7 for supplying the picture data to the printer unit 16. This allows the enlarged or contracted still picture to be printed on a printing sheet 16c in the printer unit 16.

Thus, the still picture recording/reproducing system divides the recording area of the sole frame memory 1 into the four recording areas AR1 to AR4, and write-controls the memory so that neighboring pixels will be stored in different storage areas. The four pixels neighboring the pixels to be formed are read from the storage areas AR1 to AR4, depending on the multiplication factors for enlargement or contraction. The pixels corresponding to the multiplication factor for enlargement or contraction are formed depending on the four read-out pixels and the values of address increment or decrement associated with the multiplication factor for enlargement or contraction.

Consequently, since the enlargement or contraction operation is executed based upon the picture data read out from the frame memory 1, the original picture is kept in the frame memory 1, so that, if the display, for example, of the original still picture is designated, the original picture can be displayed instantaneously.

In addition, since the picture data stored in the storage areas AR1 to AR4 of the frame memory 1 is simultaneously read out from the storage areas AR1 to AR4 for picture processing operations, real-time processing at the video rate may be achieved even although a sole inexpensive DRAM is employed as a memory.

Since the inexpensive DRAM may be employed, the still picture recording/reproducing system may be lowered in cost.

Although the storage area of the frame memory 1 is divided into four portions, it may also be divided into, for example, 9 or 16 portions. In this case, picture processing may be achieved at a higher rate than if the storage area is divided into four portions. In addition, interpolation accuracy may be improved by 9-point or 18-point interpolation.

The rotating operation of rotating a picture displayed on the monitoring device 23 in a pre-set amount for display is hereinafter explained.

In such case, the user acts on the operating unit 13 as previously described for displaying the picture fetched from the scanner 10, video input unit 11 or the storage unit 18 on the monitoring device 15. The user then turns on a rotation designation key provided on the operating unit 13. The CPU 2 detects the number of times the rotation designation key is turned on and rewrites or reads out the picture data stored in the frame memory 1 so that the displayed picture is rotated 90°, 180°, 270° and 360° each time the rotation designation key is turned on.

Figure 10:
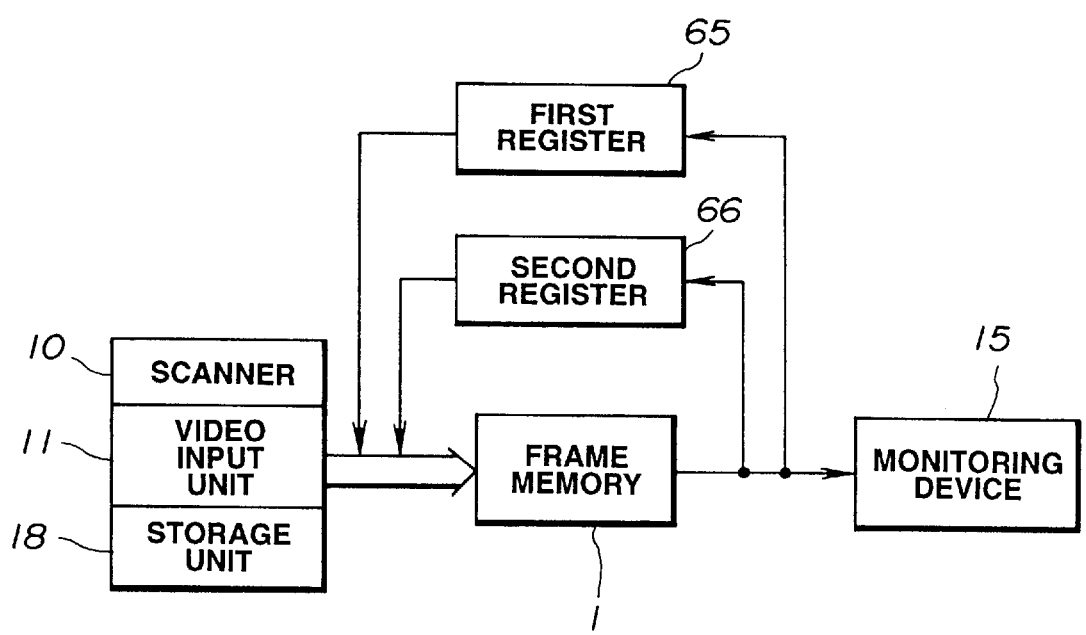
FIG. 10 is a schematic block diagram of the still picture recording/reproducing system for explaining the operation for rotation.
Figure 12:
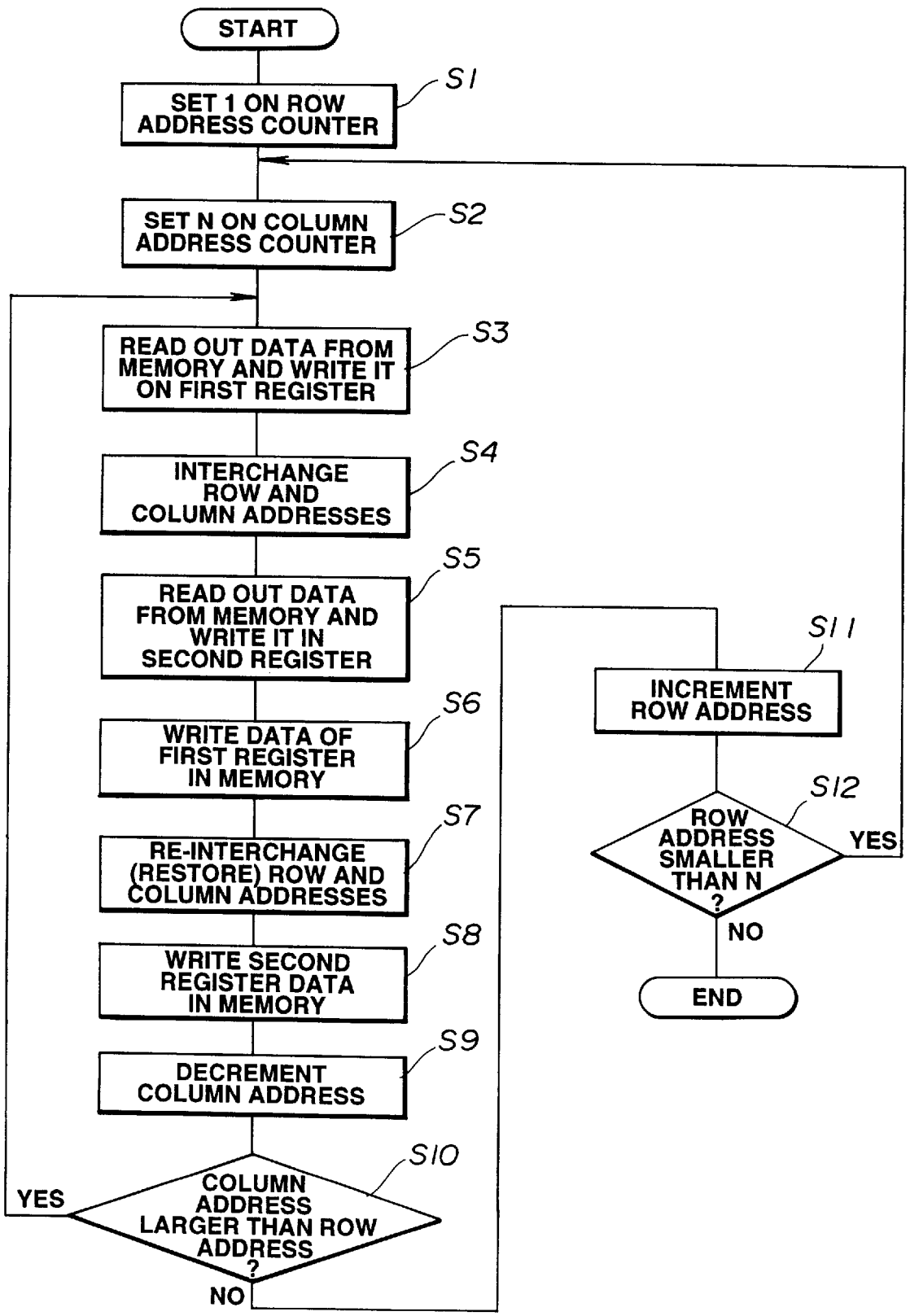
FIG. 12 is a flow chart for illustrating the rewrite operation for the frame memory during rotation.
Figure 13:
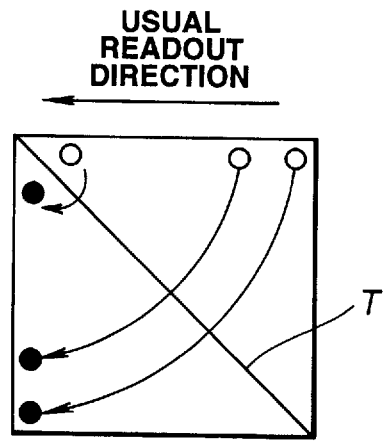
FIG. 13 is another diagrammatic view for illustrating the rewrite operation for the frame memory during rotation.

That is, the picture processing block 12 has a first register 65 and a second register 66 for temporally storing picture data read out from the frame memory 1, as shown in FIG. 10. When detecting that the rotation designation key is turned on once, the CPU 8 rewrite-controls the frame memory 1 so that the picture data stored therein on either sides of a diagonal line T are interchanged with each other, as shown in FIG. 11A. The rewrite control with the diagonal line T as a boundary as shown in FIG. 13 is carried out in accordance with the flow chart shown in FIG. 12.

It is assumed that the frame memory 1 has a storage area of N×N pixels and the CPU 8 effectuates rewrite control with the diagonal line T as the boundary. At step S1 in FIG. 12, the CPU 8 sets 1 in a row address counter, and transfers to step S2. At step S2, the CPU 8 sets N in a column address register and transfers to step S3. At step S3, the CPU 8 reads out the picture data from the frame memory 1 shown in FIG. 10 based upon the thus set row and column addresses, and causes the read-out picture data to be written in the first register 65, before the CPU 8 transfers to step S4.

At step S4, the CPU 8 interchanges the row and column addresses thus set, and transfers to step S5. At step S5, the CPU 8 reads out picture data from the frame memory 1 shown in FIG. 10, based upon the interchanged row and column addresses, and writes the read-out picture data in the second register 66, before transferring to step S6.

At step S6, the CPU 8 writes the picture data written in the first register 65, and then transfers to step S7. At step S7, the CPU 8 re-interchanges or restores the row and column addresses and then transfers to step S8.

At step S8, the CPU 8 causes the picture data written in the second register 66 to be written in the frame memory 1 before transferring to step S9. At step S9, the CPU 8 decrements the column address before transferring to step S10.

At step S10, the CPU 8 discerns whether or not the value of the column address becomes larger than the value of the row address. If the result is YES, the CPU 8 reverts to step S3 to repeat the above routine and, if the result is NO, the CPU 8 transfers to step S11.

At step S11, the CPU 8 increments the row address before transferring to step S12.

At step S12, the CPU 8 discerns whether or not the row 1 address is smaller than N. If the result is YES, the CPU 8 reverts to step S2 to repeat the above routine and, if the result is NO, the CPU 8 directly terminates the routine of the picture data interchange with the diagonal line T as a boundary.

The result of the interchange operation is that the picture data stored in the frame memory 1 is rewritten with the diagonal X line T as a boundary. Thus the picture shown in FIG. 11A becomes a picture rotated by 270° as shown in FIG. 11B.

After rewriting with the boundary line T as the boundary, the CPU 8 readout-controls the frame memory 1 for reading out the picture data from the opposite direction to the usual readout direction, as shown in FIG. 11B. Thus the picture data rotated 90° with respect to the original picture shown in FIG. 11A is stored in the frame memory 1, as shown in FIG. 11C. The CPU 8 reads out the picture data and transmits the data to the monitoring device 15. This allows the still picture rotated 90° to be displayed on the monitoring device 15.

On detecting that the rotation designation key has been turned on twice, the CPU 8 performs the above-mentioned rewrite control on the still picture, with the diagonal line T as the boundary line, as shown in FIG. 11C, and routes the re-written picture data to the monitoring device 15. Since the still picture stored in the frame memory 15 as shown in FIG. 11C is re-written with the diagonal line T as the boundary, the still picture becomes a still picture rotated 180° with respect to the original still picture, as shown in FIG. 11D. Thus the still picture rotated 180° may be displayed on the monitoring device 15.

Then, on detecting that the rotation designation key is turned on thrice, the CPU 8 performs the above-mentioned rewrite control on the still picture shown in FIG. 11D, with the diagonal line T as the boundary. This causes the picture rotated by 90° with respect to the original picture to be written in the frame memory 1, as shown in FIG. 11E. After such rewrite control, the CPU 8 readout-controls the frame memory 1 to read out the picture data from the readout direction opposite to the usual readout direction, and rewrite-controls the frame memory 1 to rewrite the picture data in such reversed readout sequence. This causes the still picture rotated by 270° with respect to the original picture of FIG. 11A to be written in the frame memory 1, as shown in FIG. 11F. The CPU 8 reads out the picture data and transmits the data to the monitoring device 15. This causes the still picture rotated 270° to be displayed on the monitoring device 15.

Then, on detecting that the rotation designation key is turned on four times, the CPU 8 performs the above-mentioned rewrite control on the still picture shown in FIG. 11F with the diagonal line T as the boundary. This restores the picture data stored in the frame memory 1 to the original position, as shown in FIG. 11G, that is, the picture data is rotated 360°. The CPU 8 reads out the picture data and transmits the data to the monitoring device 15.

Thus the picture rotated 360°. The original still picture may be displayed on the monitoring device 15.

With the still picture recording/reproducing system, the above-mentioned rewrite control during the rotation operation is performed separately and once for each of the four storage areas AR1 to AR4 of the frame memory 1.

Specifically, the rewriting of the picture data in the storage area AR1, such as rewriting of the logical addresses 02 and 20, is carried out in the storage area AR1. Similarly, the rewriting of the picture data in the storage area AR4, such as rewriting of the logical addresses 13 and 31, is carried out in the storage area AR4. On the other hand, the picture data of the logical address 03 is stored in the storage area AR2, while the picture data of the logical address 30 is stored in the storage area AR3, as shown in FIG. 3B. Thus the rewriting of the picture data in the storage area AR2 is effectuated with the picture data in the storage area AR3.

For this reason, the input and output buses of the registers provided in the storage areas AR1 and AR4 are connected to the same storage areas AR1 and AR4, while the input and output buses of the registers provided in the storage areas AR2 and AR3 are connected to memory buses of the storage areas AR3 and AR2, respectively.

Consequently, four picture data can be rewritten within a time period such that a high speed rotating operation may be achieved even though inexpensive DRAMs are employed.

The dissolve operation of display conversion from a given picture displayed on the monitoring device 23 to another picture is hereinafter explained. In this case, the user acts on the operating unit 13 to designate the dissolve operation. After designating the dissolve operation, plural pictures are fetched from the scanner 10, video input unit 11 or the storage unit 18.

Figure 14:
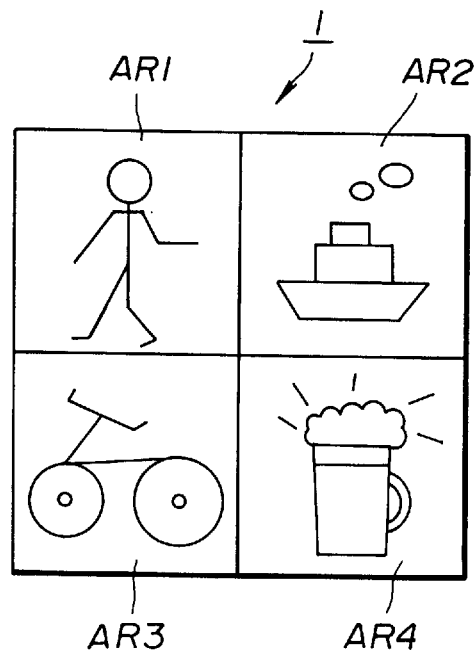
FIG. 14 shows a picture fetched during dissolution into respective storage areas of the frame memory.

When the dissolve operation is designated, the CPU 8 detects it and write-controls the frame memory 1 in order to store plural pictures, such as four pictures (fetched from the scanner 10) video input unit 11 or the storage unit 18, in the storage areas AR1 to AR4 of the frame memory 1, as shown in FIG. 14.

If, in this state, the still picture stored in the storage area AR1 is to be displayed on the monitoring device 15, the user effectuates such designation by acting on the operating unit 13. The amount of picture data stored in the storage areas AR1 to AR4 is one-fourth that when picture data for one full still picture is to be stored in each of the storage areas AR1 to AR4. Thus, when the display of the still picture stored in the storage area AR1 is designated, the CPU 8 sets the vertical delta address, which is the readout address during readout, to 02.00 and sets the horizontal delta address to 02.00, while setting the vertical start address to 00.00 and the horizontal start address to 00.00, in order to read out the picture data. This causes the still picture data stored in the storage area AR1 to be read out and transmitted to the arithmetic-logical circuit 4.

The arithmetic-logical circuit 4 performs four-fold enlargement processing on the picture data, based upon the delta address, and transmits the resulting data to the monitoring device 23 (enlargement by the delta address, vertical× horizontal=2×2). This causes a still picture corresponding to the picture data stored in the storage area AR1 to be displayed on the monitoring device 15 with the usual display size.

For performing the dissolve operation of display conversion from a given still picture stored in the storage area AR1 to another still picture stored in the storage area AR2, the user acts on the operating unit 13 for designating such dissolve operation. For enlarging the displayed picture, the CPU 8 sets the vertical delta address to 02.00 and the horizontal delta address to 02.00 while setting the vertical start address to 00.00 and varying the horizontal start address from 00.01 to 00.99. This causes the picture data to be read out from the storage areas AR1 and AR2 and transmitted to the arithmetic-logical circuit 4.

The arithmetic-logical circuit 4 interpolates the still picture data, based upon the address varied from 00.11 to 00.99, and transmits the interpolated data to the monitoring device 15. This dissolves the still picture displayed on the monitoring device 15 from the still picture stored in the storage area AR1 to the still picture stored in the storage area AR2.

If the still picture stored in the storage area AR2 is to be displayed on the monitoring device 15, the user effectuates such designation by acting on the operating unit 13. When the display of the still picture stored in the storage area AR2 is designated, the CPU 8 sets the vertical start address to 00.00 and sets the horizontal start address to 01.00, while setting the vertical delta address to 02.00 and the horizontal delta address to 02.00, in order to read out the picture data. This causes the picture stored in the storage area AR2 to be displayed on the monitoring device 15.

For performing the dissolve operation of display conversion from a given picture stored in the storage area AR2 to another picture stored in the storage area AR4, the user acts on the operating unit 13 for designating such dissolve operation. The CPU 8 sets the vertical delta address to 02.00 and the horizontal delta address to 02.00, while setting the horizontal start address to 01.01 and varying the vertical start address from 00.01 to 00.99. This dissolves the picture displayed on the monitoring device 15 from the picture stored in the storage area AR2 to the picture stored in the storage area AR4.

If the still picture stored in the storage area AR4 is to be displayed on the monitoring device 15, the user effectuates such designation by acting on the operating unit 13. When the display of the picture stored in the storage area AR4 is designated, the CPU 8 sets the vertical start address to 01.00 and sets the horizontal start address to 01.00, while setting the vertical delta address to 02.00 and the horizontal delta address to 02.00, in order to read out the still picture data. This causes the picture data stored in the storage area AR4 to be displayed on the monitoring device 15.

For performing the dissolve operation of display conversion from a given picture stored in the storage area AR4 to another picture stored in the storage area AR1, the user acts on the operating unit 13 for designating such a dissolve operation. The CPU 8 sets the vertical delta address to 02.00 and the horizontal delta address to 02.00, while varying the vertical start address from 00.99 to 01 and changing the horizontal start address from 00.99 to 00. This causes the still picture displayed on the monitoring device 15 to be dissolved from the picture stored in the storage area AR4 to the picture stored in the storage area AR1.

If the still picture stored in the storage area AR1 is to be displayed on the monitoring device 15, the user effectuates such designation by acting on the operating unit 13. When the display of the picture stored in the storage area AR1 is designated, the CPU 8 sets the vertical start address to 00.00 and sets the horizontal start address to 00.00, while setting the vertical delta address to 02.00 and the horizontal delta address to 02.00, in order to read out the picture data. This causes the picture data stored in the storage area AR1 to be displayed on the monitoring device 15.

It is possible with the still picture recording/reproducing system to effectuate the dissolve operation under control by the CPU 8. Meanwhile, the so-called fade-in and fade-out are among the dissolve operations. That is, the fade-in is the dissolution from a white-colored picture to any one of the pictures stored in the storage areas AR1 to AR4, while the fade-out is the dissolution from any one of the pictures stored in the storage areas AR1 to AR4 to a white-colored picture.

In the above description, the frame memory 1 has a storage area of 2048×2048, of which 1024×1024 is the picture storage area and 16×32 is the command area. However, this is merely illustrative and the numerical values may be suitably changed according to design statements, such as changing the size of the command area to 40×60.

Since the high-speed transfer control means in the picture processing device of the present invention effectuates high-speed transfer of command data along with picture data without the interposition of second control means, a large quantity of command data can be transferred at a high speed in a shorter time without increasing the number of interconnections as in the case of parallel transfer.

In addition, since the high-speed transfer control means effectuates transfer of the respective data without the interposition of the second control means, it becomes possible to obviate the inconvenience that the second control means be dedicated to transfer of the respective data. Thus the second control means, which is low in data processing speed and inexpensive, may be employed to lower the cost of the picture processing device.

What is claimed is:

1. A picture processing apparatus comprising:

first control means for transferring command data designating pre-set data processing along with picture data;

first storage means for transiently storing the picture data and the command data transferred from the first control means;

high-speed transfer control means for reading out the picture data and the command data stored in the first storage means and transferring the picture and command data at a high speed;

second storage means for storing the picture data and the command data transferred at a high speed from the high-speed transfer control means; and second control means for performing data processing designated by the command data stored in the second storage means.

2. The picture processing apparatus as claimed in claim 1 wherein:

the second control means write-controls the picture data and the command data in the second storage means;

the high-speed transfer means transfers the picture data and the command data written in the second storage means to the first storage means at a high speed;

the first storage means stores the picture data and the command data transferred at a high speed by the high-speed transfer means transiently therein; and the first control means reads out the picture data and the command data stored in the first storage means and performs data processing thereon as designated by the command data.

3. The picture processing apparatus as claimed in claim 1 wherein:

the second storage means has a picture storage area as an area for storage of the picture data therein and a command storage area as an area for storage of the command data therein; and wherein the high-speed transfer control means effect transfer control so that the picture data and the command data will be written in the picture storage area and in the command storage area of the second storage means, respectively.

4. The picture processing apparatus as claimed in claim 2 wherein:

the second storage means has a picture storage area as an area for storage of the picture data therein and a command storage area as an area for storage of the command data therein; and wherein the high-speed transfer control means effect transfer control so that the picture data and the command data will be written in the picture storage area and in the command storage area of the second storage means, respectively.

5. The picture processing apparatus as claimed in claim 3 wherein the command data is in ASCII code for effecting pre-set letter or character display, and wherein:

the second control means forms picture data for letters or characters conforming to the ASCII code stored in the command storage area of the second storage means and causes the picture data to be written at pre-set locations in the picture storage area.

6. An image processing apparatus comprising:

reproducing means for reproducing image data and command data corresponding with the image data from a storage device;

first storing means for transiently storing the image data and the command data which is reproduced by the reproducing means;

transfer control means for transferring the image data and the command data which is stored by the first storing means so that the command data is regarded as a kind of image data;

second storing means for storing the image data which is transferred from the transfer control means; and image processing means for processing the image data stored in the second storing means based on the command data which is transferred from the transfer means.

7. An image processing apparatus for processing reproduced image data according to predetermined command data:

a first memory for storing predetermined image data corresponding to a picture and predetermined command data corresponding to processing to be performed on the picture;

a second memory for storing the image data corresponding to a picture and the command data corresponding to processing to be performed on the picture; and transfer means for transferring the image data and the command data along the same path from the first memory to the second memory, wherein the transfer means includes an interface block and a DMAC controller for controlling the transfer of image data and command data through the transfer means.

8. The image processing apparatus according to claim 7, wherein the transfer means further comprises means for transferring the image data and the command data along the same path from the second memory to the first memory.

9. The image processing apparatus according to claim 8, wherein the path of the transfer means is a bus line.

10. The image processing apparatus according to claim 7, wherein the path of the transfer means is a bus line.

11. An image processing apparatus for processing reproduced image data according to predetermined command data:

a first memory for storing predetermined image data corresponding to a picture and predetermined command data corresponding to processing to be performed on the picture;

a second memory for storing the image data corresponding to a picture and the command data corresponding to processing to be performed on the picture; and transfer means for transferring the image data and the command data along the same path from the first memory to the second memory, wherein the transfer means includes an interface circuit, an interface block, a bus line connecting the interface circuit and the interface block, and a DMAC controller for controlling the transfer of image data and command data through the transfer means.

12. A picture processing apparatus comprising:

first control means for transferring command data designating pre-set data processing along with picture data;

first storage means for transiently storing the picture data and the command data transferred from the first control means;

high-speed transfer control means for reading out the picture data and the command data stored in the first storage means and transferring the picture and command data at a high speed;

second storage means for storing the picture data and the command data transferred at a high speed from the high-speed transfer control means;

second control means for performing data processing designated by the command data stored in the second storage means, wherein the second control means write-controls the picture data and the command data in the second storage means;

wherein the high-speed transfer control means transfers the picture data and the command data written in the second storage means to the first storage means at a high speed;

wherein the first storage means stores the picture data and the command data transferred at a high speed by the high-speed transfer control means transiently therein; and wherein the first control means reads out the picture data and the command data stored in the first storage means and performs data processing thereon as designated by the command data.

13. A picture processing apparatus comprising:

first control means for transferring command data designating pre-set data processing along with picture data;

first storage means for transiently storing the picture data and the command data transferred from the first control means;

high-speed transfer control means for reading out the picture data and the command data stored in the first storage means and transferring the picture and command data at a high speed;

second storage means for storing the picture data and the command data transferred at a high speed from the high-speed transfer control means;

second control means for performing data processing designated by the command data stored in the second storage means;

wherein the second storage means has a picture storage area as an area for storage of the picture data therein and a command storage area as an area for storage of the command data therein;

wherein the high-speed transfer control means effect transfer control so that the picture data and the command data will be written in the picture storage area and in the command storage area of the second storage means, respectively;

wherein the command data is in ASCII code for effecting pre-set letter or character display; and wherein the second control means forms picture data for letters or characters conforming to the ASCII code stored in the command storage area of the second storage means and causes the picture data to be written at pre-set locations in the picture storage area.

* * * * *